(12) United States Patent  
Carletti et al.

(10) Patent No.: US 8,503,204 B2
(45) Date of Patent: *Aug. 6, 2013

(54) POWER CONVERTER CIRCUIT

(75) Inventors: Andrea Carletti, Munich (DE); Albino Pidutti, Martignacco (IT)

(73) Assignee: Infineon Technologies AG, Neubiberg (DE)

( * ) Notice: Subject to any disclaimer, the term of this patent is extended or adjusted under 35 U.S.C. 154(b) by 179 days.

This patent is subject to a terminal disclaimer.

(21) Appl. No.: 13/204,274

(22) Filed: Aug. 5, 2011

(65) Prior Publication Data

US 2013/0033910 A1     Feb. 7, 2013

(51) Int. Cl.
*H02M 1/00* (2007.01)
(52) U.S. Cl.
USPC .............................. 363/78; 363/79; 363/80
(58) Field of Classification Search
USPC .................. 363/74, 78, 79, 80, 126, 127, 131
See application file for complete search history.

(56) References Cited

U.S. PATENT DOCUMENTS

| | | | | |
|---|---|---|---|---|
| 6,882,551 B2* | 4/2005 | Shimada et al. | ............... | 363/79 |
| 7,088,081 B2* | 8/2006 | Takahashi et al. | ............ | 323/222 |
| 7,453,248 B2* | 11/2008 | Takeuchi | ..................... | 323/285 |
| 8,184,456 B1* | 5/2012 | Jain et al. | ................... | 363/21.02 |
| 2012/0201061 A1* | 8/2012 | Hampo et al. | ................. | 363/74 |

OTHER PUBLICATIONS

"DC-to-DC converter," http://en.wikipedia.org/wiki/DC-to-DC_converter, Apr. 30, 2011, 5 pages.
"Boost Converter," http://en.wikipedia.org/wiki/Boost_converter, Jul. 22, 2011, 5 pages.
"Polyphase system," http://en.wikipedia.org/wiki/Polyphase_system, Aug. 2, 2011, 2 pages.
"Three-phase electric power," http://en.wikipedia.org/wiki/Three-phase_electric_power, Aug. 5, 2011, 8 pages.
"Inverter (electrical)," http://en.wikipedia.org/wiki/Inverter_(electrical), Aug. 8, 2011, 8 pages.

* cited by examiner

*Primary Examiner* — Adolf Berhane
*Assistant Examiner* — Lakaisha Jackson
(74) *Attorney, Agent, or Firm* — Slater & Matsil, L.L.P.

(57) ABSTRACT

A power converter includes a DC/AC converter with input terminals and output terminals. A DC/DC converter includes input terminals for receiving a DC input voltage and output terminals for providing a DC output voltage. The output terminals are coupled to the input terminals of the DC/AC converter. The DC/DC converter also includes a control circuit that is configured to control an output current of the DC/DC converter dependent on a reference signal. The reference signal has a frequency that is dependent on a frequency of the AC output voltage.

22 Claims, 7 Drawing Sheets

US 8,503,204 B2

POWER CONVERTER CIRCUIT

TECHNICAL FIELD

The present invention relates to a power converter circuit, in particular to a power converter circuit with an AC/DC converter and a DC/DC converter or with a DC/DC converter and a DC/AC converter.

BACKGROUND

Power converter circuits with an AC/DC converter and a DC/DC converter can be configured to receive an AC input voltage and to provide a DC output voltage to a load. Many electronic devices, such as computers, TV sets, etc., or batteries that have to be charged, require a DC voltage as an input voltage, while the supply voltage that is available from the power grid is an AC voltage. In these cases an AC/DC conversion, that converts the AC input voltage into a DC output voltage, is required. In particular in those cases, in which the power consumption of the load is higher than several 10 W, additionally to the power conversion, a power factor correction is required. The power factor correction serves to minimize the reactive power and to maximize the real power taken from the grid.

A power converter circuit that provides power factor correction includes a power factor corrector (PFC) and a DC/DC converter coupled to the PFC. The PFC acts as a AC/DC converter and is usually a boost converter that generates a DC voltage that is higher than the amplitude (peak value) of the AC input voltage from the AC input voltage. The DC/DC converter converts the DC voltage provided by the PFC into a DC output voltage supplied to the load voltage. The input voltage and the input current of the PFC have a sine waveform. When the power factor of the PFC is close to 1, such as between 0.97 and 1, the input voltage and the input current are almost in phase, so that the input power of the PFC has a sine squared ($sin^2$) waveform that cause ripples of the PFC output voltage. In order to reduce the amplitude of those ripples, a capacitor that is also referred to as DC link capacitor, is connected between output terminals of the PFC.

The DC link capacitor may have a capacitance of up to several mF (milli-Farads) and is usually implemented as an electrolytic capacitor. However, electrolytic capacitors have a relatively short lifetime, have high leakage currents, and are expensive.

Power converters with a DC/DC converter and DC/AC converter can be configured to receive a DC input voltage from a voltage source, such as a solar panel, a battery, or the like, and to generate an AC output voltage, that may be supplied to a power grid. In those applications, the DC/DC converter is usually implemented as a boost converter that generates a DC output voltage that is higher than the peak voltage of the desired AC output voltage. The DC/AC converter (inverter) converts the DC output voltage of the DC/DC converter into an AC output voltage. The output voltage and the output current of the DC/AC converter have a sine waveform. When the output voltage and the output current are in phase the output power of the DC/AC converter has a sine squared ($sin^2$) waveform, while the input power it receives from the DC/DC converter is constant at a given input power of the DC/DC converter. In order to reduce ripples of the DC input voltage of the DC/AC converter that may negatively affect the function of the DC/DC converter a capacitor is connected between the input terminals of the DC/AC converter.

This capacitor may have a capacitance of up to several mF (milli-Farads) and is usually implemented as an electrolytic capacitor. However, electrolytic capacitors have a relatively short lifetime, have high leakage currents, and are expensive.

There is, therefore, a need to provide a power converter circuit with a DC/DC converter and a DC/AC converter in which the size of a capacitor connected between input terminals of the DC/AC converter can be reduced without degrading the power conversion efficiency.

SUMMARY OF THE INVENTION

A first embodiment relates to a power conversion circuit, including a power converter with a DC/DC converter and a DC/AC converter. The DC/DC converter includes input terminals for receiving a DC input voltage and output terminals for providing a DC output voltage. The DC/AC converter includes input terminals coupled to the output terminals of the DC/DC converter and output terminals for providing an AC output voltage. The DC/DC converter further includes a control circuit configured to control an output current of the DC/DC converter dependent on a reference signal, the reference signal having a frequency that is dependent on a frequency of the AC output voltage.

A second embodiment relates to a power converter. The power converter includes first terminals, second terminals and third terminals. A DC/DC converter is connected between the first terminals and the third terminals, and an inverter connected between the third terminals and the second terminals. A first control circuit is configured to control operation of the DC/DC converter, and a second control circuit is configured to control operation of the inverter. The power converter is configured to operate in a DC/AC mode in which an AC voltage is provided at the second terminals from a DC voltage at the first terminals, or in a AC/DC mode in which an DC voltage is provided at the first terminals from an AC voltage at the second terminals. The first control circuit in the DC/AC mode is configured to operate the DC/DC converter such that a current provided by the DC/DC converter to the inverter is dependent on a reference signal, the reference signal having a frequency that is dependent on a frequency of the AC voltage at the second terminals. In the AC/DC mode, the first control circuit is configured to operate the DC/DC converter such that a current received by the DC/DC converter from the inverter is dependent on a reference signal, the reference signal having a frequency that is dependent on a frequency of the AC voltage at the second terminals.

BRIEF DESCRIPTION OF THE DRAWINGS

Embodiments of the present invention will now be explained with reference to the drawings. It should be noted that these embodiments serve to illustrate the basic principles, so that only those features necessary for understanding the basic principles are illustrated. The drawings are not to scale. Further, like reference characters denote like features throughout the drawings.

FIG. 9, which includes

DETAILED DESCRIPTION OF ILLUSTRATIVE EMBODIMENTS

Figure 1:
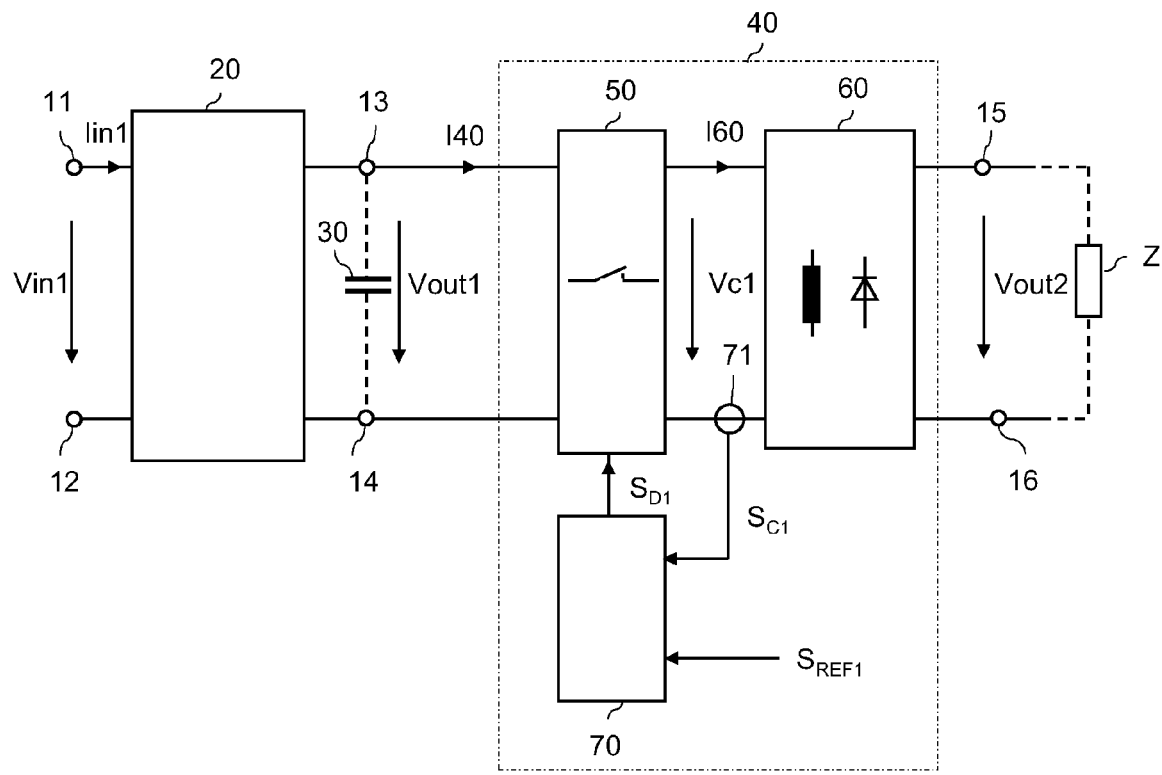
FIG. 1 schematically illustrates an embodiment of an AC/DC converter including a power factor corrector (PFC) and a DC/DC converter coupled to the PFC.

FIG. 1 schematically illustrates an embodiment on an AC/DC converter. The converter includes a power factor corrector (PFC) 20 having input terminals 11, 12 for receiving an AC input voltage Vin1 and output terminals 13, 14 for providing a first output voltage Vout1. A DC/DC converter 40 is coupled to the PFC 20 such that the DC/DC converter 40 receives the first output voltage Vout1 as an input voltage. Input terminals of the DC/DC converter 40 correspond to the output terminals 13, 14 of the PFC. The DC/DC converter 40 is configured to generate a second output voltage Vout2 from the first output voltage Vout1 of the PFC 20. The second output voltage Vout2 is a DC voltage and is available at output terminals 15, 16 of the DC/DC converter 40. The second output voltage Vout2 may be used to supply a load Z (illustrated in dashed lines in FIG. 1).

A capacitive element 30, such as a capacitor, is connected between the output terminals 13, 14 of the PFC 20. However, by virtue of a specific operating principle of the DC/DC converter 40 a capacitance of this capacitive element 30 can be relatively small as compared to conventional AC/DC converters. According to one embodiment, the capacitance of the output capacitor 30 of the PFC 20 is only approximately between 0.001 ($10^{-3}$) times and 0.01 ($10^{-2}$) times the capacitance of the output capacitor of a conventional AC/DC converter.

Figure 2:
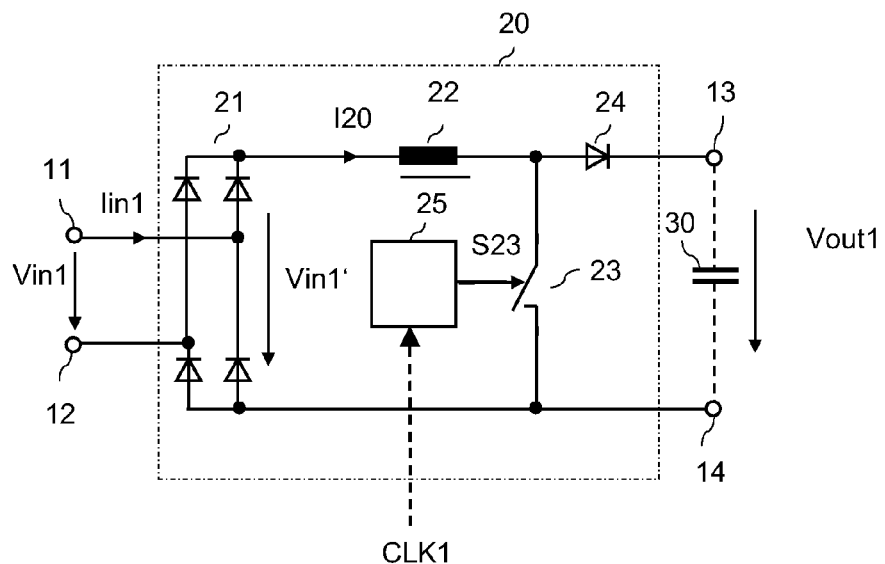
FIG. 2 illustrates an embodiment of the PFC.

The PFC 20 can be implemented like a conventional PFC. Just for illustration purposes, an embodiment of the PFC 20 is illustrated in greater detail in FIG. 2. Referring to FIG. 2, the PFC 20 may include a rectifier arrangement 21, such as a bridge rectifier, connected to the input terminals 11, 12. The rectifier arrangement 21 receives the input voltage Vin1 and is configured to generate a rectified input voltage Vin1' from the input voltage Vin1. When, for example, the input voltage Vin1 has a sine waveform, the rectified input voltage Vin1' has a waveform corresponding to the absolute value of a sine wave. The PFC 20 further has a boost converter stage that receives the rectified input voltage Vin1' and generates the first output voltage Vout1. The boost converter stage includes a series circuit with an inductive element 22, such as a choke, and an electronic switch 23. This series circuit is coupled to the rectifier arrangement 21 such that the rectified input voltage Vin1' is available across the series circuit. The electronic switch 23 is, for example, a transistor, in particular a MOSFET or an IGBT. However, the use of a MOSFET or an IGBT, is only an example. Any other switching component, such as a BJT (bipolar junction transistor), a JFET (junction field-effect transistor) or a GTO (Gate Turn-Off Thyristor) may be used as well. The same applies to other electronic switches that will be explained herein below.

The PFC 20 further includes a rectifier element 24 connected between a circuit node that is common to the inductive element 22 and the electronic switch 23 and one 13 of the output terminals 13, 14. The rectifier element 24 can be implemented as a diode (as illustrated in FIG. 2). However, the rectifier element could also be implemented as a synchronous rectifier (SR) with switching components.

The electronic switch 23 receives a pulse-width modulated (PWM) drive signal S23 from a PFC controller 25. The PFC controller 25 can be a conventional PFC controller that is configured to generate a PWM drive signal, such as PWM drive signal S23 of FIG. 2, such that a power factor is close to 1, such as between 0.97 and 1, and such that an output voltage, such as the first output voltage Vout1 in FIG. 2, is at least close to a desired voltage, such as, for example, 400V. The PWM drive signal S23 is, for example, generated with a frequency (fixed or variable) that is dependent on a clock signal CLK1 (illustrated in dashed lines in FIG. 2). This clock signal CLK1 may be an external clock signal generated by an external clock signal generator (not shown), or may be a clock signal generated in the PFC controller. Such conventional PFC controllers are commonly known so that no further explanations are required in this regard.

Again referring to FIG. 1, the DC/DC converter 40 includes a switching unit 50 coupled to the output terminals 13, 14 of the PFC 20, and an inductive rectifier 60 connected between the switching unit 50 and the output terminals 15, 16. The switching unit 50 includes at least one electronic switch, such as a transistor, and is configured to generate a clocked voltage (or square wave voltage) Vc1 from the first output voltage Vout1. The clocked voltage is generated in accordance with a pulse-width modulated (PWM) drive signal $S_D$, so that a frequency and/or a duty cycle and/or a phase of the clocked voltage corresponds to a frequency and/or a duty cycle and/or a phase of the drive signal $S_D$, respectively. The drive signal $S_D$ is generated by a control circuit 70 in a manner that will be explained in further detail herein below.

The inductive rectifier 60 includes at least one inductive element, such as, e.g., a choke and/or a transformer or elements coupled without cables, and at least one rectifier element, such as, e.g., a bipolar diode, a Schottky diode, or a synchronous rectifier. The inductive rectifier 60 is configured to rectify the clocked voltage Vc1 in order to generate the second output voltage Vout2, which is a DC voltage.

The operating principle of the control circuit 70 generating the at least one drive signal $S_D$ will now be explained. For explanation purposes it will be assumed that the input voltage Vin1 has a sine waveform so that $$V\text{in} = V_0 \cdot \sin(\omega t) \tag{1}$$

where V0 is the amplitude, and where $\omega = 2\pi \cdot f$. The input voltage Vin1 is, in particular, a voltage provided by a power grid. Dependent on the country, the amplitude A0 is, for instance, 155V (110VRMS) or 325V (230VRMS). The frequency f is usually 50 Hz or 60 Hz.

An input current Iin1 resulting from this input voltage Vin1 is:

$$I\text{in}1 = I_0 \cdot \sin(\omega t + \phi) \tag{2},$$

where I0 is an amplitude of the input current and $\phi$ is a phase shift between the input voltage Vin1 and the input current Iin1. For explanation purposes it is further assumed that a power factor of the PFC 20 is close to 1, such as between 0.97 and 1. In this case, the phase-shift $\phi$ is approximately 0. An input power Pin of the PFC 20 is then given as:

$$Pin1 = Vin1 \cdot Iin1 = V_0 \cdot I_0 \cdot \sin^2(\omega t) = \frac{1}{2} \cdot V_0 \cdot I_0 \cdot (1 - \cos(2\omega t)). \quad (3)$$

Referring to equation (3) the input power Pin varies between a maximum input power $Pin_{MAX}$, with $Pin_{MAX}=V0 \cdot I0$, and a minimum input power, which is zero, at a frequency $2\omega$ which is twice the frequency of the input voltage Vin1.

In a conventional AC/DC converter the DC/DC converter coupled to the PFC has a constant input power, so that a relatively large output capacitor of the PFC is required in order to buffer variations of the input power of the PFC 20, so that the variation of the output voltage of the PFC 20 can be reduced.

In the AC/DC converter of FIG. 1, the power circuit 70 is configured to drive the switching arrangement 50 such that an instantaneous value of an input power of the DC/DC converter 40 equals, neglecting the losses, the instantaneous input power of the PFC 20. The input power $Pin_{40}$ of the DC/DC converter equals the output power $Pout_{20}$ of the PFC ($Pin_{40}=Pout_{20}$). Further, the output power $Pout_{20}$ of the PFC equals its input power Pin ($Pin=Pout_{20}$). The PFC 20 is configured to provide a DC output voltage Vout1. Thus, in order for the input power Pin40 of the DC/DC converter to be equal to the output power Pout20 of the PFC 20, an input current I40 of the DC/DC converter 40 should be as follows:

$$I40 = \frac{Pin_{40}}{Vout1} = \frac{Pout_{20}}{Vout1} = \frac{Pin1}{Vout1} = \frac{V_0 \cdot I_0}{Vout1} \cdot \sin^2(\omega t) = \frac{1}{2} \cdot \frac{V_0}{Vout1} \cdot (1 - \cos(2\omega t)). \quad (4)$$

Thus, the control circuit 70 is configured to drive the switching arrangement 50 such that the moving average of the input current I40 of the DC/DC converter 40 has a waveform that corresponds to the waveform of the input power Pin of the PFC 20. In general, the control circuit 70 is configured to drive the switching arrangement 50, by providing the at least one drive signal $S_D$, such that the drive signal $S_D$ is dependent on a reference signal $S_{REF}$, where the reference signal $S_{REF}$ has a frequency that is dependent on the frequency of the AC input voltage. Thus, when the input voltage Vin1 is a sine wave voltage, the reference signal $S_{REF}$ is a sine squared signal. According to one embodiment, the reference signal $S_{REF}$ is derived from the input voltage Vin1 or the input current Iin1 of the PFC 20, so that the waveform of the reference signal $S_{REF}$ is in phase with the waveform of the input power Pin of the PFC.

In order to control the input current I40 of the DC/DC converter 40 the control circuit 70 receives an input current signal $S_{C1}$ that is representative of the input current I40. The input current signal $S_{C1}$ can be obtained by measuring the input current I40. In the embodiment illustrated in FIG. 1, a current measurement unit 71 that is coupled to the load path of the DC/DC converter 40 provides the current measurement signal $S_{C1}$. However, measuring the input current in order to obtain the input current signal $S_{C1}$ is only an example. The input current I40 could also be estimated or derived from another parameter, such as a voltage across individual elements of the inductive rectifier 60, a detailed example of which will be explained with reference to FIG. 3. According to one embodiment, the current measurement signal $S_{C1}$ is proportional to the input current I40.

The switching arrangement 50 is switched on and off dependent on the PWM drive signal $S_D$, so that, according to one embodiment, the square wave voltage Vc1 has a duty cycle corresponding to the duty cycle $S_D$ of the drive signal. The input current I40 is not a continuous current, but is cyclically switched on and off dependent on the drive signal $S_{D1}$. However, a switching frequency, which is a frequency of the drive signal $S_D$, is significantly higher than the frequency of the desired variations of the input current I40, so that an average value of the input current I40 meets equation (4). While the frequency of the variations of the input power Pin of the PFC 20 and, therefore, the desired variations of the input current I40 of the DC/DC converter 40 is double of the frequency of the input voltage Vin1, e.g. 100 Hz or 120 Hz, a frequency of the drive signal $S_D$ is much higher. According to one embodiment, the switching frequency is in the range of several kilohertz (kHz) and is, therefore, much faster than the desired variations of the input current I40. An "average value of the input current I20" is an average value calculated for one drive cycle or for some subsequent drive cycles of the drive signal $S_{D1}$, but for a duration that is significantly shorter than one period of the input current I20.

By controlling the input current I40 of the DC/DC converter 40 such that the input current varies in accordance with variations of the input power Pin of the PFC 20 an energy buffer at the output of the PFC 20 is not required, or only a smaller energy buffer is required. Thus, the capacitor 30 at the output of PFC 20 could be omitted, or a capacitance of this output capacitor 30 can be significantly lower than the capacitance at the output of a conventional PFC.

Figure 3:
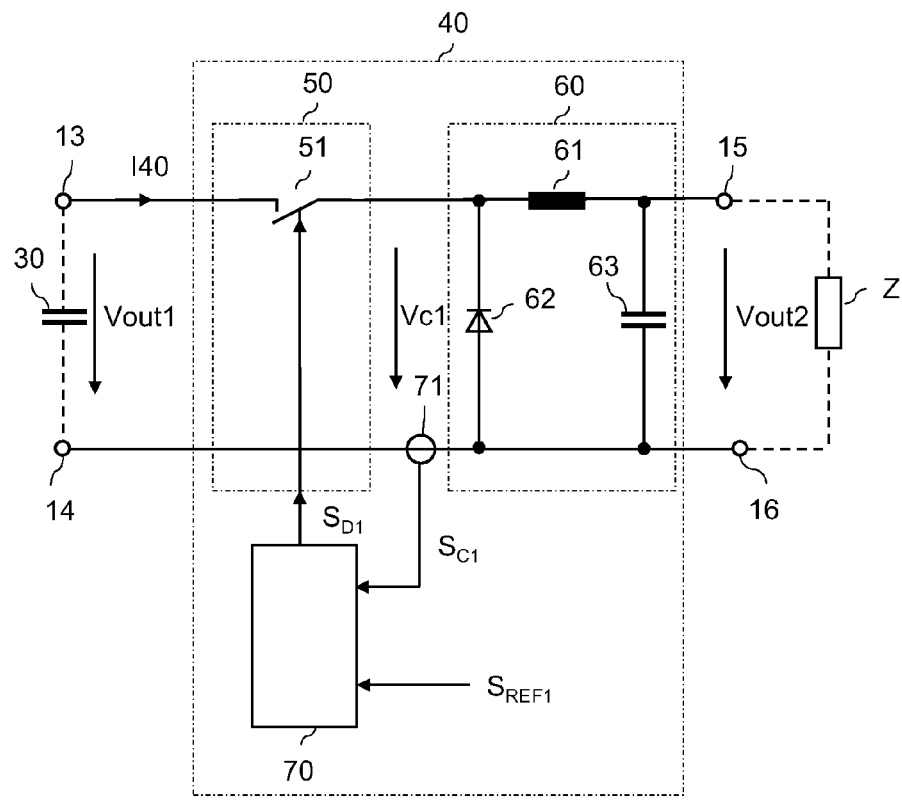
FIG. 3 illustrates an embodiment of a DC/DC converter having a buck converter topology.

The DC/DC converter can be implemented with a conventional DC/DC converter topology. FIG. 3 illustrates a simplified embodiment in which the DC/DC converter 40 has a buck converter topology. In this embodiment the switching arrangement 50 includes one electronic switch 51. The electronic switch 51 has a load path that is connected to one of the input terminals 13, 14 and has a control terminal for receiving the drive signal $S_D$. In the embodiment of FIG. 3, the electronic switch 51 is connected to a first input terminal 13 of the DC/DC converter 40.

The inductive rectifier 60 includes a series circuit with inductive element 61 such as, for example, a choke, and a capacitive element 63. This series circuit with the inductive element 61 and the capacitive element 63 is connected in series with the electronic switch 51 such that the inductive element 61 is connected between the electronic switch 51 and one of the output terminals 15, and such that the capacitive element 63 is connected between the output terminals 15, 16, so that the output voltage Vout2 is available across the capacitive element 63. A second input terminal 14 and a second output terminal 16 are electrically coupled with each other, wherein in the embodiment of FIG. 3 only the current measurement unit 71 is connected between these terminals 14, 16. The inductive rectifier 60 further includes a rectifier element 62 connected in parallel with the series circuit including the inductive element 61 and the capacitive element 63.

The operating principle of the DC/DC converter 40 illustrated in FIG. 3 will now be explained. The electronic switch 50 is cyclically switched on and off by the PWM drive signal $S_D$. When the electronic switch 51 is in its on-state, the output voltage Vout1 of the PFC (20 in FIG. 1), which is the input voltage of the DC/DC converter 40 is applied to the inductive rectifier 60. Through this, the input current I40, which is the current through the inductive element 61, increases until the electronic switch 51 is switched off. When the electronic switch 51 is switched off, the rectifier element 62 acts as a freewheeling element that takes over the current through the inductive element 61, wherein the current through the inductive element 61 decreases during the off-state of the electronic switch 51.

The input current I40 of the DC/DC converter, in particular, an average value of the input current I40, can be regulated through the PWM drive signal $S_D$, by suitably adjusting a duty cycle of the drive signal $S_D$ dependent on the current measurement signal $S_{C1}$ and the reference signal $S_{REF}$.

Figure 4:
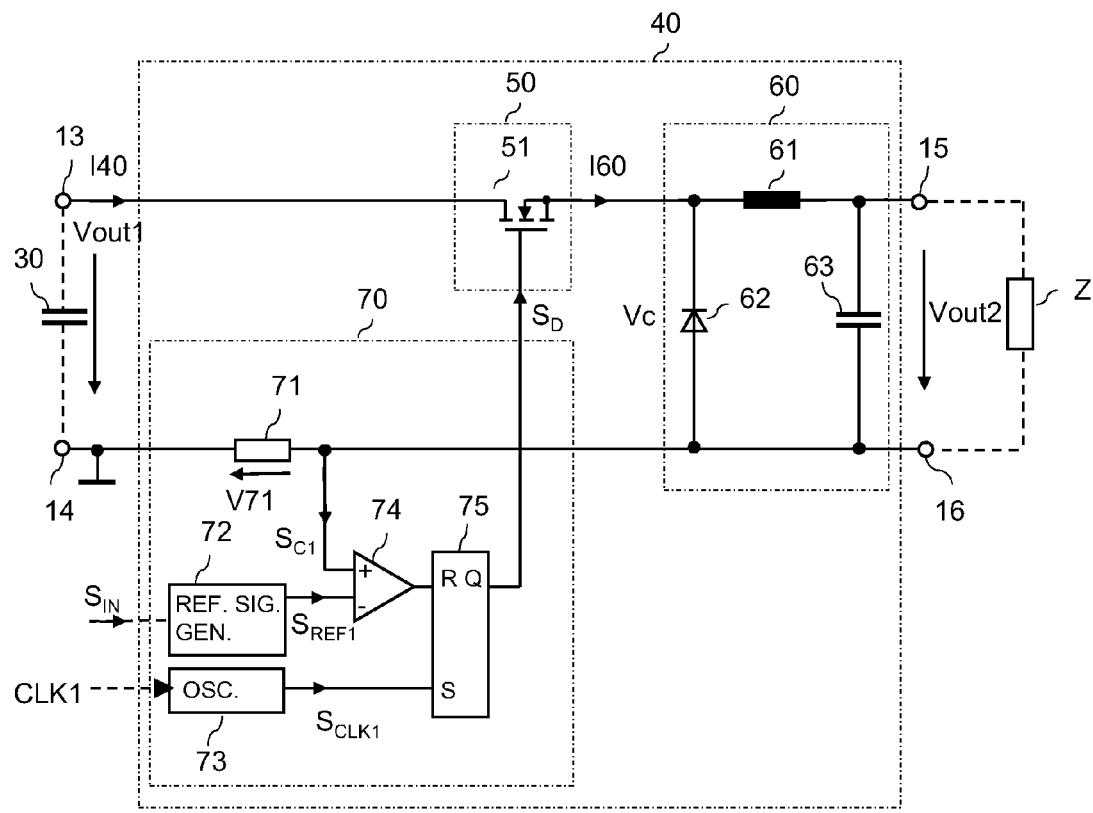
FIG. 4 illustrates the DC/DC converter of FIG. 3 wherein a control circuit of a switching element is illustrated in detail.

An embodiment of the control circuit 70 that is configured to generate the drive signal $S_D$ such that the input current I40 of the DC/DC converter 40 has the waveform of the reference signal $S_{REF}$ is illustrated in FIG. 4. The control circuit 70 includes an oscillator 73 providing a clock signal $S_{CLK1}$. This clock signal $S_{CLK1}$ defines a frequency of the PWM drive signal $S_D$. In the control circuit of FIG. 4, the clock signal $S_{CLK1}$ is received at a set input S of an SR flip-flop 75. The drive signal $S_D$ is available at a non-inverting output Q of the flip-flop 75. Optionally, a driver (not illustrated) is connected between the output Q of the flip-flop 75 and the control terminal of the electronic switch 51. This driver amplifies the logic signal available at the output of the flip-flop 75 to a signal level that is suitable to drive the electronic switch 51. According to one embodiment, the clock signal $S_{CLK1}$ provided by the oscillator 73 is synchronized with the clock signal CLK1 that governs generation of the PWM signal in the PFC. For this, the oscillator 73 may receive the clock signal CLK1.

In the embodiment according to FIG. 4, the electronic switch 51 is implemented as a MOSFET, specifically as an n-type MOSFET. However, this is only an example, any other type of electronic switch, such as an IGBT, a BJT, or a GTO may be used as well.

The control circuit 70 further includes a comparator 74 that receives the reference signal $S_{REF1}$ at a first input and the current measurement signal $S_{C1}$ at a second input. In the embodiment of FIG. 4, the first input is an inverting input of the comparator 74, and the second input is a non-inverting input of the comparator. The reference signal $S_{REF1}$ is provided by a reference signal generator 72. According to one embodiment, the reference signal generator generates the reference signal $S_{REF1}$ dependent on an input signal $S_{IN1}$. The input signal $S_{IN1}$ represents one of the input voltage Vin1 and the input current Iin1 of the PFC. According to one embodiment, the input signal $S_{IN1}$ is proportional to one of the input voltage Vin1 and the input current Iin1. According to one embodiment, the reference signal $S_{REF}$ is proportional to the square of the input signal $S_{IN}$, so that $$S_{REF1} \sim S_{IN1}^2 \tag{5}$$

If, the input signal $S_{IN}$ is proportional to the input voltage Vin1, then, referring to equation (1), the following applies:

$$S_{REF1} \sim V_0^2 \cdot \sin^2(\omega t) \tag{6}$$

In the embodiment of FIG. 4, the current measurement unit 71 is implemented as a shunt resistor 71. The current measurement signal $S_{C1}$ is a voltage V71 across the shunt resistor 71. In this embodiment, the shunt resistor 71 is connected to the second input terminal 14 of the DC/DC converter 40. This second input terminal 14 is, for example, coupled to a reference potential, such as ground, which is also the reference potential of the control circuit 70. Thus, it is sufficient to couple one of the terminals of the shunt resistor 71 to the second input terminal of the comparator 74 in order to receive the voltage V71 at the second terminal of the comparator 74.

A comparator signal, that is available at an output of the comparator 74, is received at a reset input R of the flip-flop 75. While the clock signal $S_{CLK1}$ defines the frequency of the drive signal $S_{D1}$, the comparator signal 74 defines the duty cycle of the drive signal $S_D$, wherein the duty cycle is adjusted such that the waveform of the input current I40, which is represented by the current measurement signal $S_{C1}$, follows the reference $S_{REF1}$.

Figure 5:
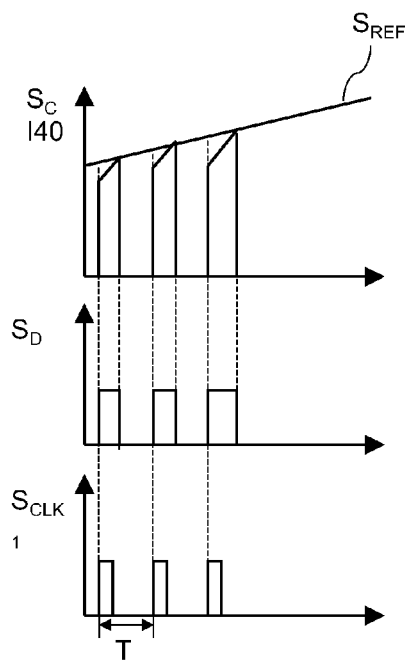
FIG. 5 shows timing diagrams illustrating the operating principle of the control circuit of FIG. 4.

The operating principle of the control circuit 70 of FIG. 4 will be explained with reference to FIG. 5 in which timing diagrams of the current measurement signal $S_{C1}$, that represents the input current I40, the clock signal $S_{CLK1}$ and the drive signal $S_D$ are illustrated. It should be noted that the DC/DC converter 40 can be operated in continuous current mode (CCM) or in discontinuous current mode (DCM). In CCM, the current through the inductive element 61 does not decrease to 0 when the electronic switch 51 is switched off, so that the input current I40 (as illustrated in FIG. 5) has a trapezoid waveform. In DCM the current through the inductive element 61 drops to 0 when the electronic switch 51 is in its off-state. In this case, the input current I40 has a triangular waveform (not shown).

In the control circuit 70 of FIG. 4, the drive signal $S_{D1}$ assumes an on-level, that switches the electronic switch 51 on, each time a signal pulse of the clock signal $S_{CLK1}$ occurs. A frequency $f_{CLK1}$ of the clock signal $S_{CLK1}$, therefore, defines the switching frequency of the drive signal $S_D$. A clock period of the clock signal $S_{CLK1}$ is $T_{CLK1}$ so that the clock frequency $f_{CLK1}$ is $1/T_{CLK1}$. In FIG. 5, an on-level of the drive signal $S_D$ is a high signal level or a logic "1" level. However, this is only an example. An on-level of the drive signal $S_D$ could also be a low level.

When the drive signal $S_{D1}$ assumes an on-level, the electronic switch 51 is switched on, so that the input current I40 increases. The electronic switch 51 is switched off, when the input current signal $S_{C1}$ reaches the reference signal $S_{REF1}$. The frequency of the reference signal $S_{REF1}$ is much smaller than the switching frequency of the drive signal $S_{D1}$, and since only several drive periods of the drive signal $S_{D1}$ are illustrated in FIG. 5, FIG. 5 only shows a small fraction of one period of the reference signal $S_{REF}$. The regulation provided by the control circuit 70 causes the duty cycle $S_{D1}$ of the drive signal to increase when the reference signal $S_{REF1}$ increases, and causes the duty cycle to decrease, when the reference signal $S_{REF1}$ decreases, wherein a moving average of the input current I40 increases when the duty cycle increases, and the moving average of the input current I40 decreases, when the duty cycle decreases. The moving average is an average of the input current on one or more drive cycles or drive periods T, such as between 1 and 10 drive cycles. Thus, a waveform of a moving average of the input current I40 follows the waveform of the reference signal $S_{REF1}$. The control circuit 70 therefore acts as a current controller that controls the input current I40 of the DC/DC converter such that a signal waveform of a moving average of the input current I40 corresponds to a waveform of the reference signal $S_{REF}$, wherein the waveform of the reference signal represents the waveform of the input power Pin of the PFC 20.

In the AC/DC converter described above, the instantaneous energy delivered by the PFC 20 is, except losses, the same as the instantaneous energy received by the DC/DC converter 40 during the switching periods.

In the AC/DC converter explained above, the output voltage of the power factor corrector 20 and the input current I40 of the DC/DC converter are controlled. However, there is no control of the output voltage Vout2 of the DC/DC converter.

An AC/DC converter of that kind can, e.g., be used to supply an electric load Z that defines the output voltage Vout2 itself such as, e.g. an accumulator or a battery to be charged. The AC/DC converter may therefore be used as a battery charger.

Figure 6:
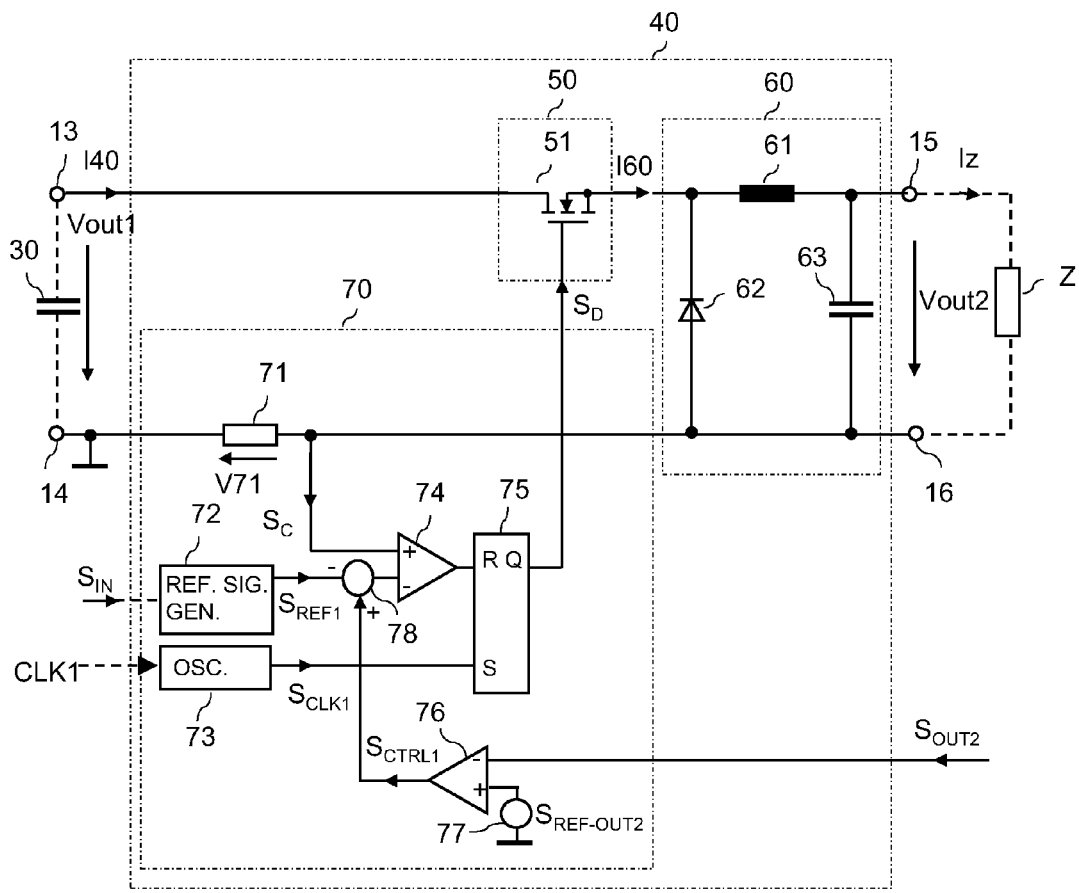
FIG. 6 illustrates a further embodiment of a DC/DC converter having a buck converter topology.

FIG. 6 illustrates an embodiment of a control circuit 70 that is not only capable of controlling the input current I40 dependent on the reference signal $S_{REF}$, but that is also capable of regulating the output voltage Vout2. However, instead of the output voltage Vout2, also the output current or the output power of the DC/DC converter could be regulated. In this embodiment, the control circuit 70 includes a controller 76 that receives an output signal $S_{OUT2}$ and a further reference signal $S_{REF-OUT2}$. The output signal $S_{OUT2}$ is dependent on the output voltage Vout2. In particular, the output signal $S_{OUT2}$ is proportional to the output voltage Vout2. The output signal $S_{OUT2}$ can be generated from the output voltage Vout2 in a conventional manner using, for example, a voltage divider (not shown). The further reference signal $S_{REF-OUT2}$ is provided by a reference voltage source 77. The further reference signal $S_{REF-OUT2}$ represents the desired voltage value of the output voltage Vout2. The controller 76 provides a control signal $S_{CTRL1}$ from a difference between the output signal $S_{OUT2}$ and the further reference signal $S_{REF-OUT2}$. The controller 76 is, for example, an integral controller (I controller) or a proportional plus integral controller (PI controller). A multiplier 78 receives the control signal $S_{CTRL1}$ and the reference signal $S_{REF}$ and provides a signal that represents the product of these two signal $S_{CTRL1}$, $S_{REF}$ to the first input terminal of the comparator 74. When, for example, the output voltage Vout2 falls below the desired voltage value, so that the output signal $S_{OUT2}$ falls below the further reference signal $S_{REF-OUT2}$, the control signal $S_{CTRL1}$ increases, and a signal level of the signal at the first input of the comparator 74 generally increases. This results in an overall increase of the duty cycle of the drive signal $S_D$. This overall increase of the duty cycle $S_D$ causes the average value of the input current I40 to increase, so as to counteract the decrease of the output voltage Vout2. It should be noted in this connection that the controller 76 is implemented such that variations of the control signal $S_{CTRL1}$ have a frequency that is much lower than the switching frequency of the drive signal $S_D$. When the output voltage Vout2 raises above the desired voltage value, the output signal $S_{OUT2}$ raises, so that the control signal $S_{CTRL1}$ decreases and the input signal at the first input of the comparator 74 generally decreases. Thus the duty cycle of the drive signal $S_{D1}$ generally decreases and the average value of the input current I40 decreases.

The control circuit 70 of FIG. 6 has two control loops. A first control loop controls the input current I40 to have a waveform corresponding to the waveform of the reference signal $S_{REF1}$. A second control loop amplifies the reference signal $S_{REF1}$ and is configured to generally increase or decrease the duty cycle of the drive signal $S_{D1}$ in order to control the output voltage Vout2. Instead of the output voltage Vout2, an output current Iz or an output power could be regulated by generating the control signal $S_{CTRL1}$ dependent on the output current Iz or the output power. The output power is the product of the output voltage Vout2 and the output current Iz.

It should be noted that using a DC/DC converter 40 having a buck converter topology is only an example. Any other DC/DC converter topology may be used as well.

The basic principle explained hereinbefore that includes controlling the input power of a DC/DC converter such that it corresponds to the output power of an AC/DC converter, such as a PFC, is applicable in an equivalent to a DC/AC converter that includes a DC/DC converter and a DC/AC converter connected to the DC/DC converter. This is explained below.

Figure 7:
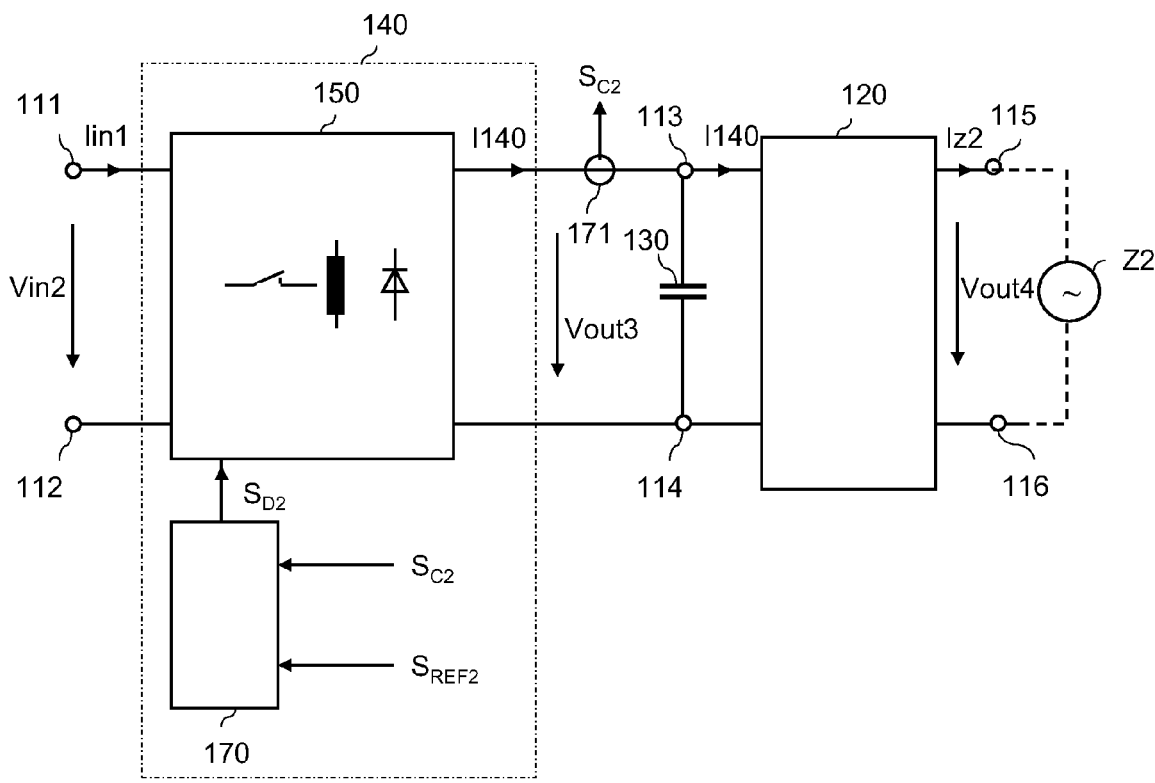
FIG. 7 schematically illustrates an embodiment of a DC/AC converter including a DC/DC converter and an inverter coupled to the DC/DC converter.

FIG. 7 schematically illustrates an embodiment on a DC/AC converter. The converter includes a DC/DC converter 140 having input terminals 111, 112 for receiving a DC input voltage Vin2 and output terminals 113, 114 for providing a first output voltage Vout3. A DC/AC converter (inverter) 120 is coupled to the DC/DC converter 140 such that the DC/DC converter 140 receives the first output voltage Vout3 as an input voltage. Input terminals of the inverter 120 correspond to the output terminals 113, 114 of the DC/DC converter. The inverter 120 is configured to generate a second output voltage Vout4 from the first output voltage Vout3 of the DC/DC converter 140. The second output voltage Vout4 is an AC voltage and is available at output terminals 115, 116 of the inverter 120.

The second output voltage Vout4 may be synchronized to the supply voltage of a power grid Z2 and may provide energy to the power grid. However, the DC/AC converter could also be configured to provide an AC output voltage that is independent of a power grid voltage. The DC input voltage may be supplied by a conventional DC power source, such as a battery, a photovoltaic (solar) module, and the like.

A capacitive element 130, such as a capacitor, is connected between the output terminals 113, 114 of the DC/DC converter 140. This capacitor acts as an output capacitor of the DC/DC converter and as an input capacitor of the inverter. However, by virtue of a specific operating principle of the DC/DC converter, a capacitance of this capacitive element 130 can be relatively small as compared to conventional DC/AC converters. According to one embodiment, the capacitance of the output capacitor 130 is only approximately between 0.001 ($10^{-3}$) times and 0.01 ($10^{-2}$) times the capacitance of the input capacitance of a conventional inverter.

The inverter 120 can be implemented like a conventional inverter. Just for illustration purposes, an embodiment of the inverter 120 is illustrated in greater detail in FIG. 8.

Figure 8:
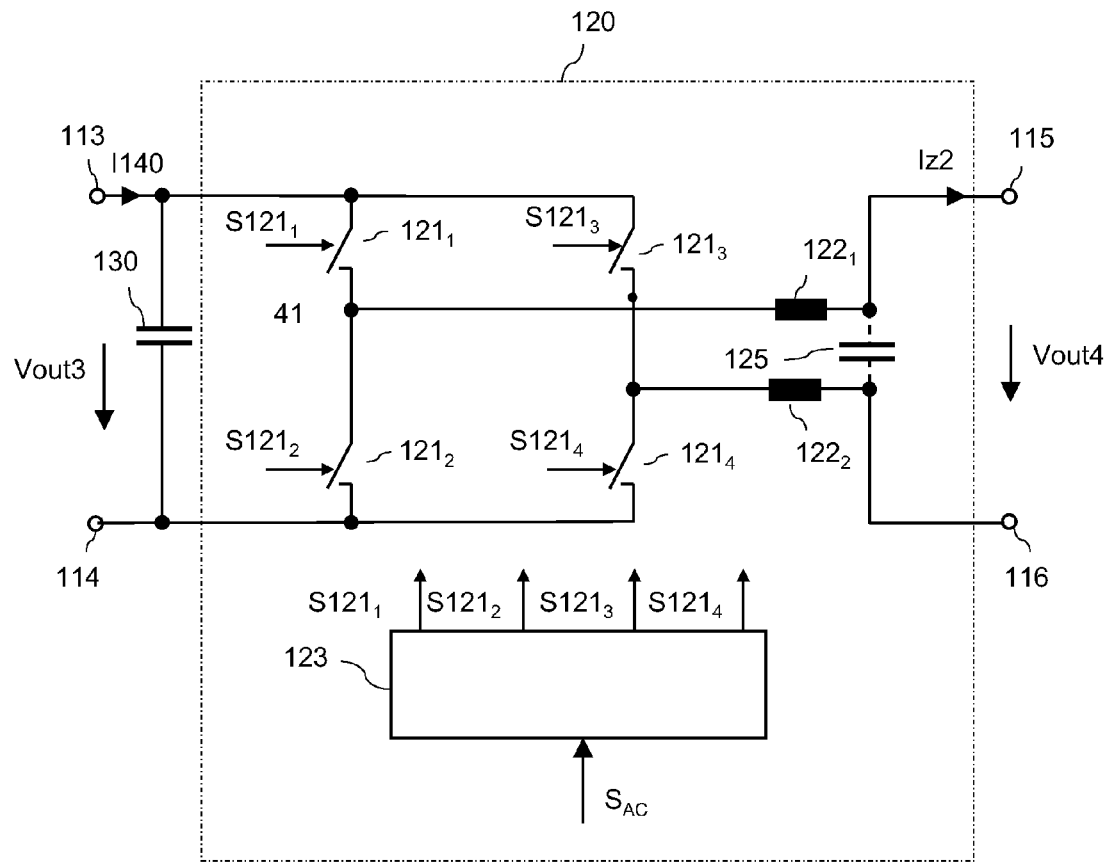
FIG. 8 illustrates an embodiment of the inverter.

The DC/DC converter 140 illustrated in FIG. 8 is a full-bridge (H4) converter with two half-bridge circuits each connected between the input terminals 113, 114. Each of these half-bridge circuits includes two switches each having a load path and a control terminal. The load paths of the two switches of one half-bridge circuit are connected in series between the input terminals 113, 114, where a first switch $121_1$ and a second switch $121_2$ form the first half-bridge, and a third switch $121_3$ and a fourth switch $121_4$ form the second half-bridge. Each of the half-bridges includes an output, where an output of the first half-bridge is formed by a circuit node common to the load paths of the first and second switch $121_1$, $121_2$. An output of the second half-bridge is formed by a circuit node common to the load paths of the third and fourth switches $121_3$, $121_4$. The output of the first half-bridge is coupled to the first output terminal 115 of the inverter 120 via a first inductive element $122_1$, such as a choke. The output terminal of the second half-bridge is coupled to the second output terminal 116 of the inverter 120 via a second inductive element $122_2$, such as a choke. According to a further embodiment (not illustrated) only one of the first and second inductive elements $122_1$, $122_2$ is employed.

Each of the switches $121_1$, $121_2$, $121_3$, $121_4$ receives a control signal $S121_1$, $S121_2$, $S121_3$, $S121_4$ at its control terminal. These control signals $S121_1$-$S121_4$ are provided by a drive circuit 123 dependent on a reference signal $S_{AC}$. The reference signal is an alternating signal that defines the frequency of the AC output voltage Vout4. According to one embodiment, the reference signal is obtained from an AC voltage of the power grid Z2 to which the output voltage of the inverter provides energy to.

The drive signal $S121_1$-$S121_4$ are pulse-width modulated (PWM) drive signals configured to switch the corresponding switch $121_1$-$121_4$ on and off. It should be noted that a switching frequency of the PWM signals $S121_1$-$S121_4$ is significantly higher than a frequency of the alternating reference signal $S_{AC}$. The reference signal $S_{AC}$ may be a sinusoidal signal with a frequency of 50 Hz or 60 Hz, depending on the country in which the power grid is implemented, while the switching frequency of the individual switches $121_1$-$121_4$ may be in the range of several kHz up to several 10 kHz, or even up to several 100 kHz. The drive circuit 123 is configured to individually adjust frequency and the duty cycle of each of the drive signals $S121_1$-$S121_4$ in order to have the waveform of the output voltage Vout4 follow the waveform of the reference signal $S_{AC}$. The duty cycle may vary between 0 and 1. When the duty cycle of one drive signal is 0, the corresponding switch is permanently switched off, and when the duty cycle of one drive signal is 1, the corresponding switch is permanently switched on. The duty cycle of a drive signal is defined by a relationship between the time period for which a drive signal switches the corresponding switch on relative to the duration of one switching cycle. The duration of one switching cycle is the reciprocal of the switching frequency.

The output voltage Vout4 is an AC voltage with positive half-cycles in which the output voltage Vout4 is positive, and a negative half-cycles in which the output voltage Vout4 is negative. The time behavior of the output voltage Vout4 is dependent on the reference signal $S_{AC}$.

Two possible operating principles of the inverter 120 are briefly explained below. First, it is assumed that a positive half-cycle of the output voltage Vout4 is to be generated from the DC input voltage Vout3. According to a first operating principle, which is known as bipolar switching or 2-level switching, the first and fourth switches $121_1$, $121_4$ are switched on and off synchronously, while the second and third switches $121_2$, $121_3$ are permanently switched off. During an on-phase of the first and fourth switches $121_k$, $121_4$ an output current Iz2 is forced through the choke(s) $122_1$, $122_2$ that is dependent on voltage difference between the input voltage Vout3 across the input capacitance 130 and the output voltage Vout4, where the output voltage Vout4 is defined by the power grid voltage. The switches $121_1$-$121_4$ each include a freewheeling element, such as a diode, that is also illustrated in FIG. 8. The freewheeling elements of the second and third switches $121_2$, $121_3$ take the current flowing through the choke(s) $122_1$, $122_2$ when the first and fourth switches $121_1$, $121_4$ are switched off. In this method, the amplitude of the output current Iz2 of the inverter can be adjusted through the duty cycle of the synchronous switching operation of the first and fourth switches $121_1$, $121_4$. During the negative half-cycle the second and third switches $121_2$, $121_3$ are switched on and off synchronously, while the first and fourth switches $121_k$, $121_4$ are permanently off.

According to a second operating principle, which is known as phase chopping or 3-level switching, the first switch $121_1$ is permanently switched on during the positive half cycle of the output voltage v2, the second and third switches $121_2$, $121_3$ are permanently off, and the fourth switch $121_4$ is switched on and off in a clocked fashion. During an on-phase of the first and fourth switches $121_1$, $121_4$ an output current Iz2 is forced through the choke(s) $122_1$, $122_2$ that is dependent on voltage difference between the input voltage Vout3 across the input capacitance 130 and the output voltage Vout4, where the output voltage Vout4 is defined by the power grid voltage. During an off-phase of the fourth switch $121_4$ a freewheeling path is provided by the freewheeling element of switch $121_3$ and the switched-on first switch $121_1$ thus enabling a zero volt state across the output chokes $122_1$, $122_2$. In this method, the amplitude of the output current Iz2 can be adjusted through the duty cycle of the switching operation of the first and fourth switch $121_1$, $121_4$. During the negative half-cycle the first and fourth switches $121_k$, $121_4$ are permanently switched off, the second switch $121_2$ is permanently switched on, and the third switch $121_3$ is switched on and off in a clocked fashion.

Figures 9A, 9B:
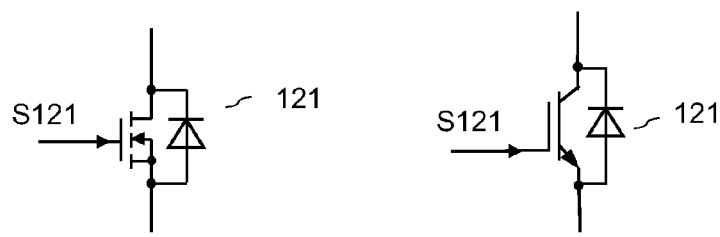
FIG. 9A and FIG. 9B, illustrates embodiments of electronic switches implemented in the inverter.

The switches $121_1$-$121_4$ may be implemented as conventional electronic switches. Referring to FIG. 9A, which illustrates a first embodiment for implementing the switches, the switches may be implemented as MOSFETs, specifically as n-type MOSFETs. Electronic switch 121 in FIG. 9A represents an arbitrary one of the switches $121_1$-$121_4$. A MOSFET, such as the n-type MOSFET illustrated in FIG. 9A has an integrated diode that is also illustrated in FIG. 9A. This diode is known as body diode and may act as a freewheeling element. A drain-source path, which is a path between a drain terminal and a source terminal, forms a load path of a MOSFET, and a gate terminal forms a control terminal.

Referring to FIG. 9B, the switches $121_1$-$121_4$ could also be implemented as IGBTs, where additionally a diode may be connected between a collector and an emitter terminal of the IGBT. This diode acts as a freewheeling element. In an IGBT, the load path runs between the emitter and the collector terminal, and the gate terminal forms a control terminal.

It should be noted that implementing the switches $121_1$-$121_4$ as MOSFETs or IGBTs is only an example. Any other type of electronic switch, such as a GTO (Gate Turn Off Thyristor) may be used as well.

Again referring to FIG. 7, the DC/DC converter 140 includes a boost unit 150 coupled to the input terminals 111, 112 and the output terminals 113, 114. The boost unit 150 includes at least one electronic switch, such as a transistor, at least one inductive element, such as, e.g., a choke and/or a transformer, and at least one rectifier element, such as, e.g., a bipolar diode, a Schottky diode, or a synchronous rectifier.

The at least one switch receives a pulse-width modulated (PWM) drive signal $S_{D2}$ that is generated by a control circuit 170 in a manner that will be explained in further detail herein below.

The operating principle of the control circuit 170 generating the at least one drive signal $S_D$ will now be explained. For explanation purposes it is be assumed that the output voltage Vout4 of the inverter 120 has a sine waveform so that:

$$V\text{out4} = V_0 \cdot \sin(\omega t) \quad (7),$$

where V0 is the amplitude, and where $\omega = 2\pi \cdot f$. This voltage Vout4 is, in particular suitable to be provided to a power grid. Dependent on the country, the amplitude A0 is, for instance, 155V (110VRMS) or 325V (230VRMS). The frequency f is usually 50 Hz or 60 Hz.

An output current Iz2 is:

$$Iz2 = I_0 \cdot \sin(\omega t + \phi) \quad (8),$$

where I0 is an amplitude of the output current Iz2 and $\phi$ is a phase shift between the output voltage Vout4 and the output current Iz2. For explanation purposes it is further assumed that the inverter 120 generates the output current Iz2 to be in phase with the output voltage Vout4.

In this case, the phase-shift φ is approximately 0. An output power Pout of the inverter 120 is then given as:

$$Pout = Vout4 \cdot Iz2 = V_0 \cdot I_0 \cdot \sin^2(\omega t) = \frac{1}{2} \cdot V_0 \cdot I_0 \cdot (1 - \cos(2\omega t)). \quad (9)$$

Referring to equation (9) the output power Pout varies between a maximum input power $Pout_{MAX}$, with $Pout_{MAX} = V_0 \cdot I_0$, and a minimum input power $Pout_{MIN}$, with $Pout_{MIN} = 0$, at a frequency 2ω which is twice the frequency of the output voltage Vout4. This variation of the output power of the inverter corresponds to variations of its input power.

In a conventional DC/AC converter including a DC/DC converter and an inverter, the DC/DC converter coupled to the DC/AC converter has a constant output power, so that a relatively large input capacitor of the inverter is required in order to buffer variations of the input power of the inverter, so that variations of the input voltage of the inverter can be reduced. Otherwise, these variations may negatively influence the behaviour of the inverter.

In the DC/AC converter of FIG. 7, the control circuit 170 is configured to drive the boost unit 150 such that an instantaneous value of an output power of the DC/DC converter 140 equals, neglecting the losses, the instantaneous output power of the DC/AC converter. The output power $Pout_{140}$ of the DC/DC converter equals the input power $Pin_{120}$ of the inverter ($Pout_{140} = Pin_{120}$). Further, the output power Pout of the inverter equals its input power Pin ($Pout_{120} = Pin_{120}$). The DC/DC converter 140 is configured to provide a DC output voltage Vout3. Thus, in order for the output power $Pout_{140}$ of the DC/DC converter to be equal to the output power $Pout_{120}$ of the inverter, an output current I140 of the DC/DC converter 140 should be as follows:

$$I140 = \frac{Pout_{140}}{Vout3} = \quad (10)$$
$$\frac{Pin_{120}}{Vout3} = \frac{Pout4}{Vout3} = \frac{V_0 \cdot I_0}{Vout3} \cdot \sin^2(\omega t) = \frac{1}{2} \cdot \frac{V_0}{Vout3} \cdot (1 - \cos(2\omega t)).$$

Thus, the control circuit 170 is configured to drive the boost unit 150 such that the moving average of the output current I140 of the DC/DC converter 140 has a waveform that corresponds to the waveform of the output power Pout of the inverter 120. In general, the control circuit 170 is configured to drive the boost unit 150, by providing the at least one drive signal $S_{D2}$, such that the drive signal $S_{D2}$ is dependent on a reference signal $S_{REF2}$, where the reference signal $S_{REF2}$ has a frequency that is dependent on the frequency of the AC output voltage. Thus, when the output voltage Vout4 is a sine wave voltage, the reference signal $S_{REF2}$ is a sine squared signal. According to one embodiment, the reference signal $S_{REF2}$ is derived from the output voltage Vout4 or the output current Iz2 of the inverter, so that the waveform of the reference signal $S_{REF2}$ is in phase with the waveform of the output power Pout of the inverter.

In order to control the output current I140 of the DC/DC converter 140 the control circuit 170 receives an output current signal $S_{C2}$ that is representative of the output current I140. The output current signal $S_{C2}$ can be obtained by measuring the output current I140. In the embodiment illustrated in FIG. 7, a current measurement unit 171 that is coupled to the load path of the DC/DC converter 140 provides the current measurement signal $S_{C2}$. However, measuring the output current in order to obtain the input current signal $S_{C1}$ is only an example. The output current I140 could also be estimated or derived from other parameters occurring in the boost unit. According to one embodiment, the current measurement signal $S_{C2}$ is proportional to the output current I140.

By controlling the output current I140 of the DC/DC converter 140 such that the output current varies in accordance with variations of the output power Pout of the inverter 120 an energy buffer at the input of the inverter 120 is not required, or only a smaller energy buffer than in conventional DC/AC converters is required. Thus, the capacitor 130 at the input of the inverter 120 could be omitted, or a capacitance of this capacitor 130 can be significantly lower than the capacitance at the input of a conventional inverter.

Figure 10:
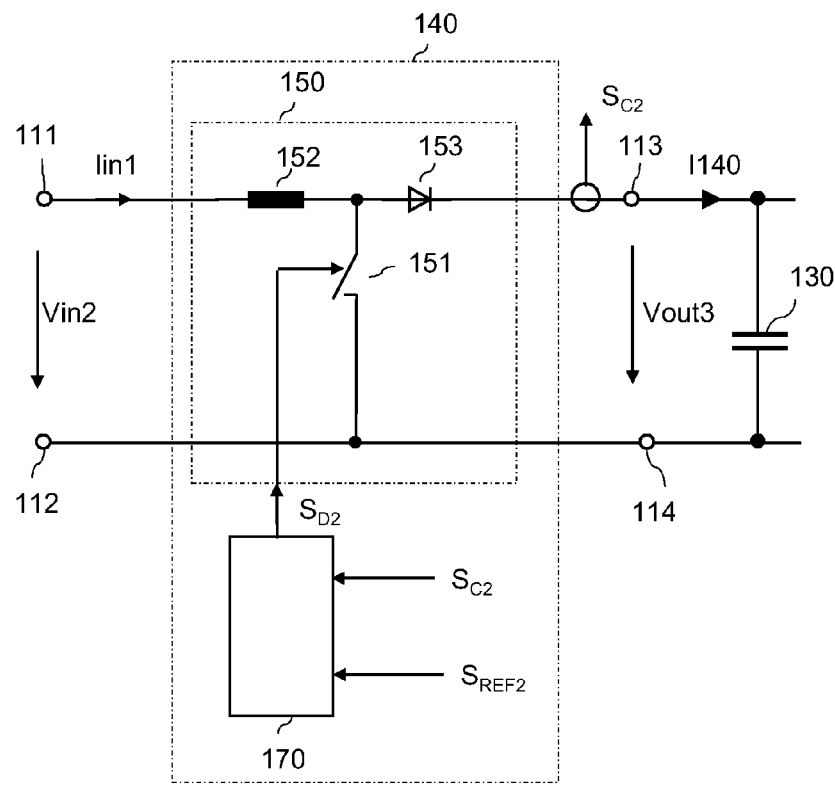
FIG. 10 illustrates an embodiment of a DC/DC converter having a boost converter topology.

The DC/DC converter can be implemented with a conventional DC/DC converter topology. FIG. 10 illustrates a simplified embodiment in which the DC/DC converter 140 has a boost converter topology. In this embodiment the boost unit 150 includes a series circuit with an inductive element 152, such as a choke, and an electronic switch 151 connected between the input terminals, where the inductive element 152 is coupled to the first input terminal 111, while the electronic switch 151 is connected to the second input terminal 112. The electronic switch 151 has a load path that is connected in series with the inductive element 152 and has a control terminal for receiving the drive signal $S_{D2}$. In the embodiment according to FIG. 10, the electronic switch 151 is implemented as a MOSFET, specifically as an n-type MOSFET. However, this is only an example, any other type of electronic switch may be used as well.

Referring to FIG. 10, a circuit node common to the inductive element 152 and the electronic switch 151 is connected to the first output terminal 113 via a rectifier element, such as a diode (as illustrated) or a synchronous rectifier (not illustrated). The second output terminal 114 is connected to the second input terminal 112.

The operating principle of the DC/DC converter 140 illustrated in FIG. 3 will now be explained. The electronic switch 151 is cyclically switched on and off by the PWM drive signal $S_{D2}$. When the electronic switch 151 is in its on-state, the input voltage Vin2 is applied to the inductive element 152, so that energy is magnetically stored in the inductive element 152 and the input current Iin1 increases until the electronic switch 151 is switched off. An output current I140 is zero at this time. When the electronic switch 151 is switched off, the inductive element drives an output current I140 through the rectifier element 153. Right after switching off the electronic switch 151 the output current I140 corresponds to input current Iin1 right before switching off the electronic switch 151, where the output current decreases during the off-time of the electronic switch. The rectifier element 153 helps to prevent that the capacitance 130 is discharged when the electronic switch 151 is switched on.

The output current I140 of the DC/DC converter, in particular an average value of the input current I140, can be regulated through the PWM drive signal $S_{D2}$, by suitably adjusting a duty cycle of the drive signal $S_{D2}$ dependent on the current measurement signal $S_{C2}$ and the reference signal $S_{REF2}$. The electronic switch 151 is switched on and off dependent on the PWM drive signal $S_{D2}$. The output current I140 is not a continuous current, but is cyclically switched on and off dependent on the drive signal $S_{D2}$. However, a switching frequency, which is a frequency of the drive signal $S_{D2}$, is significantly higher than the frequency of the desired variations of the output current I140, so that an average value of the output current I40 meets equation (10). While the frequency of the variations of the output power Pout of the inverter and, therefore, the desired variations of the output current I140 of the DC/DC converter 140 is twice the frequency of the output voltage Vout4, e.g., 100 Hz or 120 Hz, a frequency of the drive signal $S_{D2}$ is much higher. According to one embodiment, the switching frequency is in the range of several kilohertz (kHz) and is, therefore, much faster than the desired variations of the output current I140. An "average value of the output current" is an average value calculated for one drive cycle or for some subsequent drive cycles of the drive signal $S_{D2}$, but for a duration that is significantly shorter than one period of the output current I140.

An embodiment of the control circuit 170 that is configured to generate the drive signal $S_{D2}$ such that the output current I140 of the DC/DC converter 140 has the waveform of the reference signal $S_{REF2}$ is illustrated in. The control circuit 170 includes an oscillator 173 providing a clock signal $S_{CLK2}$. This clock signal $S_{CLK2}$ defines a frequency of the PWM drive signal $S_{D2}$. In the control circuit of FIG. 11, the clock signal $S_{CLK2}$ is received at a set input S of a SR flip-flop 175. The drive signal $S_{D2}$ is available at a non-inverting output Q of the flip-flop 175. Optionally, a driver (not illustrated) is connected between the output Q of the flip-flop 175 and the control terminal of the electronic switch 151. This driver amplifies the logic signal available at the output of the flip-flop 175 to a signal level that is suitable to drive the electronic switch 151. According to one embodiment, the clock signal $S_{CLK2}$ provided by the oscillator 173 is synchronized with a clock signal CLK2 that governs generation of drive signals $S121_1$-$S121_4$ in the inverter 120. For this, the oscillator 173 may receive the clock signal CLK2.

Figure 11:
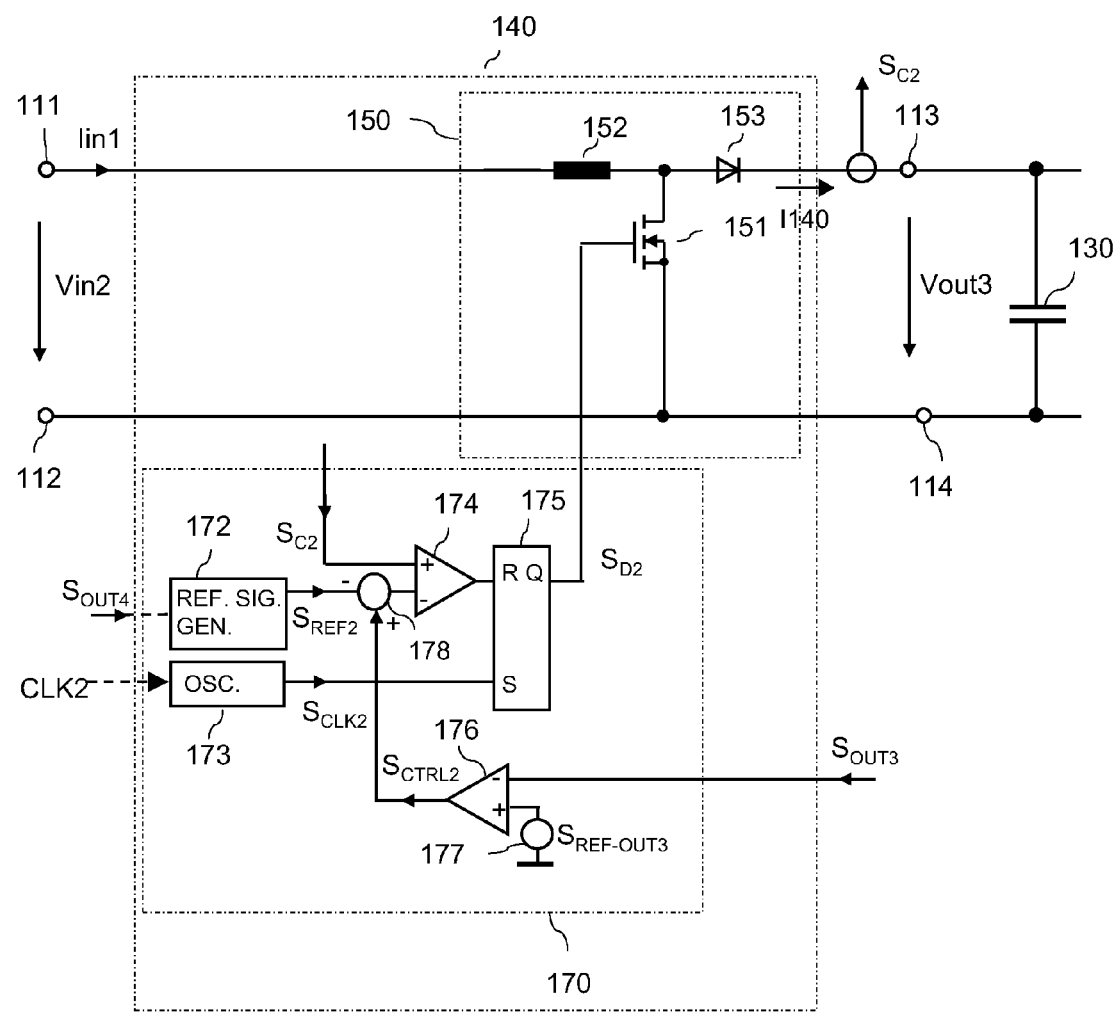
FIG. 11 illustrates the DC/DC converter of FIG. 10 wherein a control circuit of a switching element is illustrated in detail.

The control circuit 170 further includes a comparator 174 that receives the reference signal $S_{REF2}$ at a first input and the current measurement signal $S_{C2}$ at a second input. In the embodiment of FIG. 11, the first input is an inverting input of the comparator 174, and the second input is a non-inverting input of the comparator. The reference signal $S_{REF2}$ is provided by a reference signal generator 172. According to one embodiment, the reference signal generator generates the reference signal $S_{REF2}$ dependent on an output signal $S_{OUT4}$. The output signal $S_{OUT4}$ represents one of the output voltage Vout4 and the output current Iz2 of the inverter 120. According to one embodiment, the output signal $S_{OUT4}$ is proportional to one of the output voltage Vout4 and the output current Iz2. According to one embodiment, the reference signal $S_{REF2}$ is proportional to the square of the output signal $S_{OUT4}$, so that $$S_{REF2} \sim S_{OUT4}^2 \qquad (11).$$

If, the output signal $S_{OUT4}$ is proportional to the output voltage Vout4, then, referring to equation (7), the following applies:

$$S_{REF2} \sim V_0^2 \cdot \sin^2(\omega t) \qquad (12).$$

The current measurement unit 171 can be implemented like a conventional current measurement unit. Those current measurement units are commonly known, so that no further explanations are required in this regard.

A comparator signal, that is available at an output of the comparator 174, is received at a reset input R of the flip-flop 175. While the clock signal $S_{CLK2}$ defines the frequency of the drive signal $S_{D2}$, the comparator signal 174 defines the duty cycle of the drive signal $S_{D2}$, wherein the duty cycle is adjusted such that the waveform of the output current I140, which is represented by the current measurement signal $S_{C2}$, follows the reference $S_{REF2}$.

The DC/DC converter 140 may be operated in continuous current mode (CCM), so that the current through the inductive element 152 does not decrease to 0 when the electronic switch 151 is switched off. Thus, the output current I140 has a trapezoid waveform. However, it is also possible to operate the DC/DC converter in discontinuous current mode (DCM). In DCM the current through the inductive element 152 drops to 0 when the electronic switch 151 is in its off-state. In this case, the input current I140 has a triangular waveform (not shown).

In the control circuit 170 of FIG. 11, the drive signal $S_{D2}$ assumes an on-level, that switches the electronic switch 151 on, each time a signal pulse of the clock signal $S_{CLK2}$ occurs. A frequency $f_{CLK2}$ of the clock signal $S_{CLK2}$, therefore, defines the switching frequency of the drive signal $S_{D2}$. A clock period of the clock signal $S_{CLK2}$ is $T_{CLK2}$ so that the clock frequency $f_{CLK2}$ is $1/T_{CLK2}$. This frequency may be a fixed frequency or may be a variable frequency.

When the drive signal $S_{D2}$ assumes an on-level, the electronic switch 151 is switched on, so that the input current Iin1 increases. The electronic switch 151 is switched off, when the input current signal $S_{C2}$ reaches the reference signal $S_{REF2}$. The frequency of the reference signal $S_{REF2}$ is much smaller than the switching frequency of the drive signal $S_{D2}$. The regulation provided by the control circuit 170 causes the duty cycle $S_{D2}$ of the drive signal to increase when the reference signal $S_{REF2}$ increases, and causes the duty cycle to decrease, when the reference signal $S_{REF2}$ decreases. Thus a (moving) average of the output current I140 increases when the duty cycle increases, and the (moving) average of the output current I140 decreases, when the duty cycle decreases. The moving average is an average of the output current I140 over one or more drive cycles or drive periods T, such as between 1 and 10 drive cycles. Thus, a waveform of a moving average of the output current I140 follows the waveform of the reference signal $S_{REF2}$. The control circuit 170 therefore acts as a current controller that controls the output current I140 of the DC/DC converter such that a signal waveform of a moving average of the output current I140 corresponds to a waveform of the reference signal $S_{REF2}$, wherein the waveform of the reference signal $S_{REF2}$ represents the waveform of the output power Pout of the inverter 120.

In the AC/DC converter described above, the instantaneous energy delivered by DC/DC converter 140 is, except losses, the same as the instantaneous energy provided by the inverter 120 at the output terminals 115, 116.

In the DC/AC converter explained above, the output voltage of the inverter may be defined by the voltage of a power grid Z2, that acts like a huge voltage source. However, it is also possible for the DC/AC converter to provide an AC supply voltage to a (standalone) load.

The control circuit 170 of FIG. 11 is not only capable of controlling the output current I140 dependent on the reference signal $S_{REF2}$, but is also capable of regulating the output voltage Vout3 of the DC/DC converter 140. For this, the control circuit 170 includes a controller 176 that receives an output signal $S_{OUT3}$ and a further reference signal $S_{REF\text{-}OUT3}$. The output signal $S_{OUT2}$ is dependent on the output voltage Vout3. In particular, the output signal $S_{OUT3}$ is proportional to the output voltage Vout2. The output signal $S_{OUT3}$ can be generated from the output voltage Vout2 in a conventional manner using, for example, a voltage divider (not shown). The further reference signal $S_{REF\text{-}OUT3}$ is provided by a reference voltage source 177. The further reference signal $S_{REF\text{-}OUT3}$ represents the desired voltage value of the output voltage Vout3. The controller 176 provides a control signal $S_{CTRL2}$ from a difference between the output signal $S_{OUT3}$ and the further reference signal $S_{REF\text{-}OUT3}$. The controller 176 is, for example, an integral controller (I controller) or a proportional plus integral controller (PI controller). A multiplier 178 receives the control signal $S_{CTRL2}$ and the reference signal $S_{REF2}$ and provides a signal that represents the product of these two signal $S_{CTRL2}$, $S_{REF2}$ to the first input terminal of the comparator 174. When, for example, the output voltage Vout3 falls below the desired voltage value, so that the output signal $S_{OUT3}$ falls below the further reference signal $S_{REF-OUT3}$, the control signal $S_{CTRL2}$ increases, and a signal level of the signal at the first input of the comparator 174 generally increases. This results in an overall increase of the duty cycle of the drive signal $S_{D2}$. This overall increase of the duty cycle $S_{D2}$ causes the average value of the output current I140 to increase, so as to counteract the decrease of the output voltage Vout3. It should be noted in this connection that the controller 176 is implemented such that variations of the control signal $S_{CTRL2}$ have a frequency that is much lower than the switching frequency of the drive signal $S_{D2}$. When the output voltage Vout3 raises above the desired voltage value, the output signal $S_{OUT3}$ raises, so that the control signal $S_{CTRL2}$ decreases and the input signal at the first input of the comparator 74 generally decreases. Thus the duty cycle of the drive signal $S_{D2}$ generally decreases and the average value of the input current I140 decreases.

The control circuit 170 of FIG. 11 has two control loops. A first control loop controls the output current I140 to have a waveform corresponding to the waveform of the reference signal $S_{REF2}$. A second control loop, by amplifying the reference signal $S_{REF2}$, is configured to generally increase or decrease the duty cycle of the drive signal $S_{D2}$ in order to control the output voltage Vout3.

Figure 12:
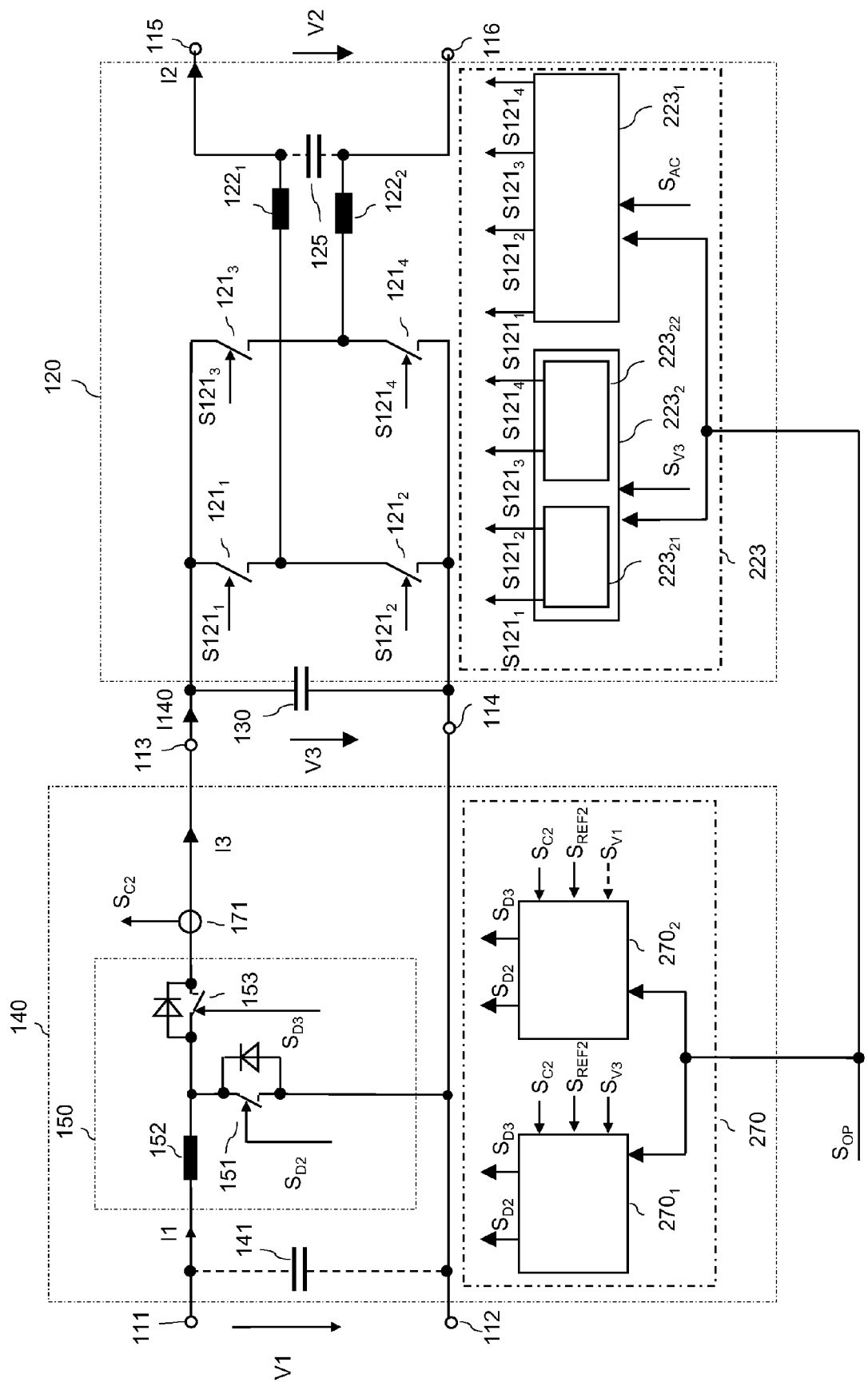
FIG. 12 illustrates an embodiment of a bidirectional converter.

FIG. 12 illustrates a converter with a DC/DC converter 140 as illustrated in FIG. 10 and an inverter 120 as illustrated in FIG. 8, wherein in the DC/DC converter 140, the rectifier element is implemented as an electronic switch 153 that has optionally a freewheeling element, such as a diode connected in parallel thereto. The freewheeling element is connected such that it provides a freewheeling path from the inductive element 152 to the first output terminal 113 even when the electronic switch 153 is in the off-state. The electronic switch 153 will be referred to as second switch, while the electronic switch 151 will be referred to as first switch in the following. According to one embodiment, the rectifier element 153 is implemented as a MOSFET (not shown) with an integrated body diode. When the MOSFET is implemented as an n-type MOSFET, a source terminal of the MOSFET is connected to the inductive element 152, while the drain terminal is connected to the output 113.

The electronic switch 151 may also have a freewheeling element, such as a diode, connected in parallel thereto. The freewheeling element provides a freewheeling path for the inductive element 152 between the second and first input terminals 112, 111 even when the electronic switch 151 in the off-state. The electronic 151 switch may be implemented as a MOSFET with an integrated body diode, where the body diode acts as a freewheeling element. It should be noted that instead of MOSFETs IGBTs with internal or external diodes may be used as well for the electronic switches 151, 153 with the parallel freewheeling elements. In some embodiments the switches 151, 153 could be implemented as synchronous rectifiers.

In connection with the embodiment illustrated in FIG. 12, the terminals 111, 112 of the DC/DC converter will be referred to as first terminals 111, 112 of the converter, the terminals 115, 116 of the inverter 120 will be referred to as second terminals of the converter, and the terminals 113, 114 common to the DC/DC converter 140 and the inverter 120 will be referred to as third terminals.

Before describing the implementation and the operating principle of the converter of FIG. 12 in detail, the implementation and the operating principle is briefly summarized. The power converter includes the first terminals 111, 112, the second terminals 115, 116, and the third terminals 113, 114. The DC/DC converter 140 is connected between the first terminals 111, 112 and the third terminals 113, 114, and the inverter 120 is connected between the third terminals 113, 114 and the second terminals 115, 116. A first control circuit 270 is configured to control operation of the DC/DC converter 140, and a second control circuit 223 is configured to control operation of the inverter 120. The power converter can be operated in a DC/AC mode in which an AC voltage V2 is provided at the second terminals 115, 116 from a DC voltage V1 at the first terminals 111, 112, or in a AC/DC mode in which a DC voltage V1 is provided at the first terminals 111, 112 from an AC voltage V2 at the second terminals 115, 116. The first control circuit 270 in the DC/AC mode is configured to operate the DC/DC converter 140 such that a current I3 provided by the DC/DC converter 140 to the inverter 120 is dependent on a reference signal $S_{REF2}$, the reference signal $S_{REF2}$ having a frequency that is dependent on a frequency of the AC voltage V2 at the second terminals 115, 116. In the AC/DC mode, the first control circuit is configured to operate the DC/DC converter 140 such that a current I3 received by the DC/DC converter 140 from the inverter 120 is dependent on a reference signal $S_{REF2}$, the reference signal $S_{REF2}$ having a frequency that is dependent on a frequency of the AC voltage V2 at the second terminals 115, 116.

When the converter of FIG. 12 is operated as a DC/AC converter the first terminals 111, 112 are input terminals that receive a DC voltage V1 as an input voltage, and the second terminals 115, 116 are output terminals that provide an AC voltage V2 as an output voltage. A current at the first terminals I1 is an input current and a current I2 at the second terminals 115, 116 is an output current in this case. The operating principle of the converter of FIG. 12 when operated as a DC/AC converter corresponds to the operating of the converter illustrated in FIG. 7. According to this operating principle, the DC/DC converter is operated as a boost converter and controls an output current I3 of the DC/DC converter to have a signal waveform that is defined by a reference signal $S_{REF2}$, where this reference signal is dependent on the signal waveform of the output voltage V2. Further, the DC/DC converter 140 controls its output voltage, which is the voltage between the third terminals 113, 114 to correspond to a given set-value.

Operation of the DC/DC converter 140 is governed by a control circuit 270, that includes two control units, namely a first control unit $270_1$ that controls the DC/DC converter 140 when the converter is operated as a DC/AC converter, and a second control unit $270_2$ that controls the DC/DC converter 140 when the converter is operated as a AC/DC converter. The first control unit $270_1$ is, for example, implemented like the control circuit 170 illustrated in FIG. 11. The first control unit 170 receives an output current signal $S_{C2}$ that represents the (average) output current for controlling the output current I3, and an output voltage signal $S_{v3}$ that represents the voltage V3 at the third terminals 113, 114 for controlling this voltage to assume a set-value. The reference signal $S_{REF2}$ that defines the signal waveform of the output current I3 can be generated in the first control unit $270_1$ as explained in connection with FIG. 11, or can be provided to the first control unit $270_1$ from an external reference signal generation circuit (not illustrated in FIG. 12).

Operation of the converter as a DC/AC converter will be referred to as operation in a DC/AC mode, while operation of the converter as an AC/DC converter will be referred to as operation in an AC/DC mode.

When the converter is in DC/AC mode, the DC/DC converter is operated as a boost converter. In this mode of operation, the first switch 151 is driven by a PWM drive signal $S_{D2}$ provided by the first control unit $270_1$. The duty cycle of this drive signal $S_{D2}$ is dependent on the current signal $S_{C2}$, the reference signal $S_{REF2}$ and the output voltage signal $S_{V3}$ such that the waveform of the output current I3 corresponds to a waveform defined by the reference signal $S_{REF2}$ and such that the output voltage V3 corresponds to a given set value. In the DC/AC mode, the second switch acts as a rectifier that is driven in the on-state each time the first switch 151 is switched off and as long as the current I3 flows from the inductive element 152 to the capacitor 130. A drive signal $S_{D3}$ of the second switch 153 is, for example, derived from the drive signal $S_{D2}$ of the first electronic switch 151, that will be referred to as first drive signal in the following. The first drive signal $S_{D2}$ can be generated as explained in connection with FIG. 11.

According to one embodiment, the second drive signal $S_{D3}$ assumes an on-level that switches the second switch 153 on each time the first drive signal $S_{D2}$ assumes an off-level that switches the first switch off, while the second drive signal $S_{D3}$ keeps the on-level as long as there is a positive current from the inductive element 152 to the capacitor 130. When the DC/DC converter is operated in CCM so that the current I3 does not decrease to zero when the first switch is switched off, the second switch 153 is switched on until the first switch 151 is again switched on. In this case, the second switch 153 is driven complementary to the first switch.

When, however, the DC/DC converter is operated in DCM, the current I3 decreases to zero when the first switch 151 is switched off. In this case the second switch 153 is switched off as soon as the current has decreased to zero in order to prevent the capacitor 130 from being discharged.

According to one embodiment there is a dead-time between switching off one of the first and second switches 151, 153 and switching on the other one of the first and second switches 151, 153.

When the converter is operated as a DC/AC converter. The inverter 120 is operated as explained with reference to FIG. 8 and generates the AC output voltage V2 from the voltage V3 at the third terminals 113, 114. The signal waveform of the output voltage V2 is defined by an AC reference signal $S_{AC}$.

Operation of the inverter 120 is governed by a control circuit 223, that includes two control units, namely a first control unit $223_1$ that controls the inverter 120 when the converter is operated as a DC/AC converter, and a second control unit $223_2$ that controls the inverter 120 when the converter is operated as a AC/DC converter. The first converter unit $223_1$ is, for example, implemented like the control circuit 123 illustrated in FIG. 11. This first control unit $223_1$ receives the AC reference signal $S_{AC}$.

When the converter of FIG. 12 is operated as an AC/DC converter, the first terminals 111, 112 are output terminals that provide a DC voltage V1 as an output voltage, and the second terminals 115, 116 are input terminals that receive an AC voltage V2 as an input voltage. The current I3 flowing between the DC/DC converter 140 and the inverter 120 is the input current of the DC/DC converter 140, where this current flows in a direction that is opposite to the direction indicated in FIG. 12, when the converter is operated as an AC/DC converter. In the AC/DC the current I1 at the first terminals 111, 112 is an output current of the converter that flows in a direction that is opposite to the direction indicated in FIG. 12.

The operating principle of the converter of FIG. 12 when operated in DC/AC mode corresponds to the operating of the converter illustrated in FIG. 1, where the inverter 120 is operated as a PFC and the DC/DC converter 140 is operated as a buck converter. In accordance with this operating principle, the DC/DC converter 140 is operated as a boost converter and controls an input current I3 of the DC/DC converter to have a signal waveform that is defined by a reference signal $S_{REF2}$, where this reference signal is dependent on the signal waveform of the input voltage V2. Optionally, the DC/DC converter 140 controls its output voltage V1, which is the voltage between the first terminals 111, 112 to correspond to a given set-value. Operation of the DC/DC converter 140 in AC/DC mode is governed by the second control unit $270_2$ that receives an input current signal $S_p$ representing the input current I3, the reference signal $S_{REF2}$ and optionally an output current signal representing the voltage V1 at the first terminals 111, 112.

When the DC/DC converter is operated as a buck converter, the second switch 153 is driven in PWM fashion by the second driven signal $S_{D3}$ provided by the second control unit $270_2$. The duty cycle of this second drive signal $S_{D3}$ is dependent on the current signal $S_{C2}$, the reference signal $S_{REF2}$ and the output voltage signal $S_{V3}$ such that the waveform of the input current I3 corresponds to a waveform defined by the reference signal $S_{REF2}$, and optionally such that the output voltage V1 corresponds to a given set value. The second drive signal $S_{D3}$ can be generated like the drive signal $S_D$ explained with reference to FIGS. 4 and 6, so that the second control unit $270_2$ may basically correspond to the control circuit 70 explained with reference to these FIGS. 4 and 6.

In the AC/DC mode, the first switch 151 acts as a freewheeling element that is driven in the on-state each time the second switch 153 is switched off and as long as the (positive) output current I1 flows from the inductive element 152 to the output (represented by the first terminals 111, 112). The first drive signal $S_{D2}$ of the first switch 151 is, for example, derived from the second drive signal $S_{D3}$ of the second switch 153.

According to one embodiment, the first drive signal $S_{D2}$ assumes an on-level that switches the first switch 151 on each time the second drive signal $S_{D3}$ assumes an off-level that switches the second switch 153 off, while the first drive signal $S_{D2}$ keeps the on-level as long as there is a positive current I1 from the inductive element 152 to the output 130. When the DC/DC converter is operated in CCM so that the current I1 does not decrease to zero when the second switch 153 is switched off, the first switch 151 is switched on until the second switch 153 is again switched on. In this case, the first switch 151 is driven complementary to the second switch 153.

When, however, the DC/DC converter is operated in DCM, the current I1 decreases to zero when the second switch 153 is switched off. In this case the first switch 151 is switched off as soon as the current has decreased to zero. According to one embodiment there is a dead-time between switching off one of the first and second switches 151, 153 and switching on the other one of the first and second switches 151, 153.

Optionally, a capacitor 141 is connected between the first terminals 111, 112 that acts as an input capacitor when the converter is operated in DC/AC mode and that acts as an output capacitor when the converter is operated in AC/DC mode.

The operating principle of the inverter 120 when the converter is in AC/DC mode is explained in the following. As seen from the second terminals 115, 116 which are input terminals when the converter is in AC/DC mode, the inverter has two boost converter topologies, namely a first boost converter topology with the first choke $122_1$ and the first half-bridge $121_1$, $121_2$, and a second boost converter topology with the second choke $122_2$ and the second half-bridge $121_3$, $121_4$. The second control circuit $223_1$ of the inverter is configured to activate the first boost converter topology, which means to activate the first half-bridge $121_1$, $121_2$, during a positive half cycle of the input voltage V2 and to activate the second boost converter topology, which means to activate the second half-bridge $121_1$, $121_2$, during a negative half cycle of the input voltage. The second control unit $223_2$ may include two conventional PFC control circuits $223_{21}$, $223_{22}$ where one PFC control circuit $223_{21}$ controls the first boost converter topology during the positive half cycle of the input voltage when the second topology is deactivated, while the other PFC control circuit $223_{22}$ controls the second boost converter topology during the negative half cycle of the input voltage V2 when the first topology is deactivated. When a half-bridge or boost converter topology is activated, the half-bridge switches are switched on and off in PWM fashion, while the half-bridge switches are switched off when a half-bridge or boost converter topology is deactivated.

The operation of the inverter 120 as a PFC will be explained with reference to the operation of the first boost converter topology. In this topology, the second switch $121_2$ of the half-bridge is driven by a PWM drive signal $S121_2$ provided by the first PFC control circuit $223_{21}$ such that the input current I2 is in phase with input voltage V2 and that the voltage V3 between the third terminals 113, 114 equals a given set-value. The first switch $121_1$ of the half-bridge acts as rectifier that is switched on when the second switch $121_2$ is switched off and as long as a current flows to the capacitor 130. Optionally there is a dead time between switching off one of these switches $121_k$, $121_2$ and switching on the other one of these switches $121_k$, $121_2$. The operation of the second boost topology corresponds to the operation of the first topology, where in the second boost topology the third switch $121_3$ is driven by a PWM drive signal $S121_3$, while the fourth switch is operated as a rectifier.

Whether the converter of FIG. 12 is operated in DC/AC mode or in AC/DC mode is dependent on an operation mode signal received by the control circuits 270, 223. These control circuits 270, 223 are configured to operate in DC/AC mode or in AC/DC mode dependent on this control signal $S_{OP}$. The operation mode signal may assume two different signal level, a first signal level indicating that the converter is operated in the DC/AC mode, and a second signal level indicating that the converter is operated in the AC/DC mode. The operation mode signal is, for example, an external signal that can be set by a user. According to one embodiment, the first control units $270_1$, $223_1$ of the control circuits 270, 223 are activated and the second control units $270_2$, $223_2$ are deactivated when the operation mode signal $S_{OP}$ indicates that the converter is to be operated in the DC/AC mode. Equivalently, the second control units $270_2$, $223_2$ of the control circuits 270, 223 are activated and the first control units $270_1$, $223_1$ are deactivated when the operation mode signal $S_{OP}$ indicates that the converter is to be operated in the AC/DC mode.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power converter comprising:
    a DC/AC converter comprising input terminals and output terminals for providing an AC output voltage; and
    a DC/DC converter comprising input terminals for receiving a DC input voltage and output terminals for providing a DC output voltage, the output terminals of the DC/DC converter coupled to the input terminals of the DC/AC converter, the DC/DC converter further comprising a control circuit configured to control an output current of the DC/DC converter dependent on a reference signal, the reference signal having a frequency that is dependent on a frequency of the AC output voltage.

2. The power converter of claim 1, wherein the DC/DC converter further comprises:
    a switching arrangement coupled to the input terminals of the DC/DC converter and having a control terminal for receiving at least one drive signal; and
    an inductive rectifier arrangement coupled between the switching arrangement and the output terminals of the DC/DC converter;
    wherein the control circuit is configured to provide the at least one drive signal for the switching arrangement dependent on the reference signal.

3. The power converter of claim 2, wherein the control circuit comprises:
    an oscillator configured to provide a clock signal with a clock frequency;
    a current evaluation unit configured to provide an output current signal that is dependent on the output current of the DC/DC converter;

a comparator configured to compare the reference signal with the output current signal and to provide a comparator signal; and a logic circuit configured to receive the clock signal and the comparator signal and configured to generate the at least one drive signal as a clocked signal with a frequency corresponding to the clock frequency and with a duty cycle that is dependent on the comparator signal.

4. The power converter of claim 1, wherein the control circuit is configured to control the output current of the DC/DC converter such that a moving average of the output current is dependent on the reference signal.

5. The power converter of claim 4, wherein the moving average of the output current is proportional to the reference signal.

6. The power converter of claim 1, wherein the reference signal has a waveform that is proportional to the square of a waveform of the AC output voltage.

7. The power converter of claim 1, wherein the reference signal has a sine squared waveform and wherein the frequency of the reference signal is two times the frequency of the AC output voltage.

8. The power converter of claim 1, wherein the control circuit includes a reference signal generator coupled to the output terminals of the DC/AC converter and configured to provide the reference signal.

9. The power converter of claim 1, wherein the control circuit comprises a first control loop configured to control the output current dependent on the reference signal.

10. The power converter of claim 9, wherein the control circuit further comprises one or more additional control loops.

11. The power converter of claim 1, wherein the DC/DC converter is implemented as a boost converter.

12. A power converter, comprising:
  first terminals, second terminals and third terminals;
  a DC/DC converter connected between the first terminals and the third terminals;
  an inverter connected between the third terminals and the second terminals;
  a first control circuit configured to control operation of the DC/DC converter;
  a second control circuit configured to control operation of the inverter;
  wherein the power converter is configured to operate in a DC/AC mode in which an AC voltage is provided at the second terminals from a DC voltage received at the first terminals, or in a AC/DC mode in which an DC voltage is provided at the first terminals from an AC voltage received at the second terminals;
  wherein the first control circuit in the DC/AC mode is configured to operate the DC/DC converter such that a current provided by the DC/DC converter to the inverter is dependent on a reference signal, the reference signal having a frequency that is dependent on a frequency of the AC voltage at the second terminals; and
  wherein the first control circuit in the AC/DC mode is configured to operate the DC/DC converter such that a current received by the DC/DC converter from the inverter is dependent on a reference signal, the reference signal having a frequency that is dependent on a frequency of the AC voltage at the second terminals.

13. The power converter of claim 12, wherein the first control circuit is further configured in the DC/AC mode to operate the DC/DC converter such that a voltage at the third terminals corresponds to a first set-value.

14. The power converter of claim 12, wherein the first control circuit is further configured in the AC/DC mode to operate the DC/DC converter such that a voltage at the first terminals corresponds to a second set-value.

15. The power converter of claim 12, wherein the second control circuit is configured in the DC/AC mode to operate the inverter such that the AC voltage at the second terminals has a frequency defined by an AC reference signal received by the second control circuit.

16. The power converter of claim 12, wherein the second control circuit is configured in the AC/DC mode to operate the inverter such that a current received by the inverter is at least approximately in phase with the AC voltage at the second terminals.

17. The power converter of claim 12, wherein the second control circuit in the AC/DC mode is further configured to operate the inverter such that a voltage at the third terminals corresponds to a third set-value.

18. The power converter of claim 12, wherein the DC/DC converter comprises:
  a series circuit with an inductive element and a first electronic switch coupled to the first terminals; and
  a series circuit with the first electronic switch and a second electronic switch coupled to the third terminals,
  wherein the first control circuit is configured to control the first and second electronic switches.

19. The power converter of claim 12, wherein the inverter comprises:
  a first half-bridge comprising a first output coupled to the third terminals;
  a first inductive element coupled between the first output and one of the second terminals;
  a second half-bridge comprising a second output coupled to the third terminals; and
  a second inductive element coupled between the second output and the other one of the second terminals,
  wherein the second control circuit is configured to control the first and second half-bridges.

20. The power converter of claim 19, wherein the second control circuit is further configured in the AC/DC mode
  to activate the first half-bridge and to deactivate the second half-bridge during a positive half-cycle of the AC voltage at the second terminals, and
  to activate the second half-bridge and to deactivate the first half-bridge during a negative half-cycle of the AC voltage at the second terminals.

21. The power converter of claim 12, further comprising a first capacitive element coupled between the third terminals.

22. The power converter of claim 12, further comprising a second capacitive element coupled between the first terminals.

* * * * *